United States Patent
Xie et al.

(10) Patent No.: US 10,038,976 B2
(45) Date of Patent: Jul. 31, 2018

(54) LOCATION MOVEMENT METHOD FOR SELF-MOBILE NODE, AND RELATED DEVICE

(71) Applicant: HUAWEI TECHNOLOGIES CO., LTD., Shenzhen (CN)

(72) Inventors: Yong Xie, Chengdu (CN); Xueliang Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/391,093

(22) Filed: Dec. 27, 2016

(65) Prior Publication Data

US 2017/0111767 A1    Apr. 20, 2017

Related U.S. Application Data

(63) Continuation of application No. PCT/CN2014/081306, filed on Jun. 30, 2014.

(51) Int. Cl.
*H04W 36/00*    (2009.01)
*H04M 1/00*    (2006.01)
(Continued)

(52) U.S. Cl.
CPC ......... *H04W 4/023* (2013.01); *H04W 64/003* (2013.01); *H04W 84/005* (2013.01)

(58) Field of Classification Search
CPC ....... H04W 60/06; H04W 4/02; H04W 48/20; H04W 64/00; H04W 4/23
(Continued)

(56) References Cited

U.S. PATENT DOCUMENTS 7,110,377 B2 * 9/2006 Hsu ................ H04W 60/06
                                                370/331
7,376,430 B2 * 5/2008 Matsuda ............ G01S 5/0263
                                                455/456.1
(Continued)

FOREIGN PATENT DOCUMENTS

CN    101057157 A    10/2007
CN    103501532 A    1/2014
(Continued)

OTHER PUBLICATIONS

International Search Report dated Mar. 27, 2015 in corresponding International Patent Application No. PCT/CN2014/081306.
(Continued)

*Primary Examiner* — William D Cumming
(74) *Attorney, Agent, or Firm* — Staas & Halsey LLP

(57) ABSTRACT

A location movement method for a self-mobile node, and a related device are provided. A self-mobile node can move to a corresponding initial to-be-assisted location range according to initial to-be-assisted location information determined by the self-mobile node or determined by a control device; and after moving to the initial to-be-assisted location range, can move to a final finely adjusted to-be-assisted location range according to finely adjusted to-be-assisted location information determined by the self-mobile node or determined by the control device, and provide an assistance service for another to-be-assisted node within the final to-be-assisted location range. Therefore, a currently existing problem is resolved: Because a precise indoor map cannot be obtained, a self-mobile node cannot move to an accurate to-be-assisted area based on an indoor map. As a result, accuracy and applicability of on-demand movement of the self-mobile node are improved.

20 Claims, 12 Drawing Sheets

(51) Int. Cl.
*H04W 4/02* (2018.01)
*H04W 64/00* (2009.01)
*H04W 84/00* (2009.01)

(58) Field of Classification Search
USPC .............................. 455/437, 438, 440, 456.1
See application file for complete search history.

(56) References Cited

U.S. PATENT DOCUMENTS

| | | | | |
|---|---|---|---|---|
| 7,835,324 | B2* | 11/2010 | Chowdhury | H04L 29/06 370/331 |
| 8,023,464 | B2* | 9/2011 | Hsu | H04W 60/06 370/331 |
| 8,781,506 | B2* | 7/2014 | Siomina | G01S 5/0236 455/456.1 |
| 8,798,633 | B2* | 8/2014 | Sergeyev | H04W 48/20 455/438 |
| 9,445,340 | B2* | 9/2016 | Siomina | H04W 64/00 |
| 9,516,570 | B2* | 12/2016 | Siomina | H04W 64/00 |
| 2004/0071112 | A1 | 4/2004 | Hsu | H04W 60/06 370/331 |
| 2004/0185870 | A1* | 9/2004 | Matsuda | G01S 5/0263 455/456.1 |
| 2005/0068229 | A1* | 3/2005 | Moilanen | G01S 19/06 342/357.42 |
| 2005/0094601 | A1* | 5/2005 | Hsu | H04W 60/06 370/331 |
| 2006/0002326 | A1 | 1/2006 | Vesuna | |
| 2007/0120737 | A1* | 5/2007 | Moilanen | G01S 19/06 342/357.42 |
| 2007/0294226 | A1* | 12/2007 | Chahal | H04W 4/02 |
| 2008/0014963 | A1 | 1/2008 | Takizawa et al. | |
| 2010/0150070 | A1 | 6/2010 | Park et al. | |
| 2013/0033999 | A1* | 2/2013 | Siomina | G01S 5/0236 370/252 |
| 2014/0057635 | A1* | 2/2014 | Sergeyev | H04W 48/20 455/440 |
| 2014/0080489 | A1* | 3/2014 | Siomina | H04W 64/00 455/437 |
| 2014/0080506 | A1* | 3/2014 | Siomina | H04W 64/00 455/456.1 |
| 2017/0111767 | A1* | 4/2017 | Xie | H04W 4/023 |

FOREIGN PATENT DOCUMENTS

| | | |
|---|---|---|
| WO | 2008/134763 A1 | 11/2008 |
| WO | 2011/124941 A1 | 10/2011 |
| WO | 2013/028228 A1 | 2/2013 |

OTHER PUBLICATIONS

Extended European Search Report dated Apr. 3, 2017 in corresponding European Patent Application No. 14896395.2.
Qualcomm Incorporated: "Positioning support with HeNBs" 3GPP DRAFT; R3-100342, Mobile Competence Centre, 650, Route Des Lucioles; F-06921 Sophia Antipolis Cedex, France, vol. RAN WG3 No. Valencia Spain; Jan. 15, 2010.
International Search Report dated Mar. 27, 2015, in corresponding International Application No. PCT/CN2014/081306.

* cited by examiner

201

A control device determines to-be-assisted location information, where the to-be-assisted location information includes one or more of initial to-be-assisted location information or finely adjusted to-be-assisted location information, the initial to-be-assisted location information is location information determined by the control device according to an assistance request received from at least one to-be-assisted node, and the finely adjusted to-be-assisted location information is location information determined by the control device according to capability information of an assisting node, and location information and load information of each to-be-assisted node after the assisting node moves to an initial location range corresponding to the initial to-be-assisted location information

202

The control device sends the determined to-be-assisted location information to the assisting node, so that the assisting node moves, according to the to-be-assisted location information, to a location range corresponding to the to-be-assisted location information

The obtaining initial to-be-assisted location information comprises:

receiving a first assistance indication that carries the initial to-be-assisted location information and is delivered by the control device, and obtaining the initial to-be-assisted location information according to the first assistance indication.

FIG. 8

The obtaining initial to-be-assisted location information comprises:

receiving the assistance request initiated by the at least one to-be-assisted node, and determining the initial to-be-assisted location information according to the received assistance request initiated by the at least one to-be-assisted node.

The determining the initial to-be-assisted location information according to the received assistance request initiated by the at least one to-be-assisted node comprises:

selecting any one or more to-be-assisted nodes from the at least one to-be-assisted node; and using, as the initial to-be-assisted location information, area information comprising location information or coverage area information of the any one or more selected to-be-assisted nodes; or using, as the initial to-be-assisted location information, area information comprising location information or coverage area information of a backhaul node used by the any one or more selected to-be-assisted nodes; or using, as the initial to-be-assisted location information, area information comprising an area corresponding to area identification information of the any one or more selected to-be-assisted nodes.

FIG. 10

┌─ 1100
│
The obtaining finely adjusted to-be-assisted location information comprises:

reporting the capability information of the self-mobile node to the control device after the moving to an initial location range, and obtaining the finely adjusted to-be-assisted location information according to a second assistance indication that carries the finely adjusted to-be-assisted location information and is delivered by the control device.

The obtaining finely adjusted to-be-assisted location information comprises:

sending assistance information to each to-be-assisted node around a location of the self-mobile node after the moving to an initial location range; receiving assistance response information that is returned by each to-be-assisted node around the location of the self-mobile node and is corresponding to the assistance information, wherein the assistance response message carries the location information and the load information of each to-be-assisted node; and determining the finely adjusted to-be-assisted location information according to the capability information of the self-mobile node, and the location information and the load information of each to-be-assisted node that are carried in the received assistance response information.

The determining the finely adjusted to-be-assisted location information according to the capability information of the self-mobile node, and the location information and the load information of each to-be-assisted node that are carried in the received assistance response information comprises:

selecting multiple to-be-assisted nodes from all the to-be-assisted nodes around the location of the self-mobile node according to the capability information of the self-mobile node, and the load information of each to-be-assisted node that is carried in the assistance response information, wherein corresponding load of the multiple to-be-assisted nodes is not less than a specified load threshold; and determining the finely adjusted to-be-assisted location information according to location information and load information of the multiple selected to-be-assisted nodes, wherein the determined finely adjusted to-be-assisted location information can enable the self-mobile node located within the finely adjusted location range corresponding to the finely adjusted to-be-assisted location information to meet the following specified condition: products of distances from the self-mobile node to the multiple selected to-be-assisted nodes and load of the multiple selected to-be-assisted nodes are equal to or are approximately equal to each other.

FIG. 13

---
LOCATION MOVEMENT METHOD FOR SELF-MOBILE NODE, AND RELATED DEVICE

CROSS-REFERENCE TO RELATED APPLICATIONS

This application is a continuation of International Application No. PCT/CN2014/081306, filed on Jun. 30, 2014, the disclosure of which is hereby incorporated by reference in its entirety.

TECHNICAL FIELD

Embodiments of the present invention relate to the field of communications technologies, and in particular, to a location movement method for a self-mobile node, and a related device.

BACKGROUND

A self-mobile network refers to a network system having a mobile node that can change a location of the mobile node according to a requirement. The mobile node that can change the location of the mobile node according to the requirement can be referred to as a self-mobile node for short, for example, a mobile robot having a WiFi (Wireless Fidelity) function, or another network access function or network service function.

Specifically, in the self-mobile network, all self-mobile nodes generally need to assist each other according to a network status and a load status of each self-mobile node. However, artificial intelligence on the self-mobile node still cannot implement effective identification of an environment, that is, movement of the self-mobile node is controlled behavior in the self-mobile network, and the self-mobile node itself does not have a capability of identifying a surrounding environment and cannot rapidly and independently find a target location. Therefore, to resolve the foregoing problem, a solution in which movement control of the self-mobile node is implemented based on an indoor map and an indoor positioning technology (such as WiFi locating) is currently put forward in the industry.

However, because a large quantity of indoor temporary deployment scenarios exist in the self-mobile network, a precise indoor map cannot be obtained. Therefore, the self-mobile node cannot move to an accurate to-be-assisted area when movement control of the self-mobile node is implemented based on an indoor map. As a result, accuracy and applicability of movement control of the self-mobile node are greatly reduced. In addition, because the self-mobile node in the self-mobile network moves frequently, that is, the network status of the self-mobile network changes dynamically, difficulty of obtaining the precise indoor map is further increased. As a result, control accuracy when movement control of the self-mobile node is implemented based on an indoor map is further reduced.

SUMMARY

Embodiments of the present invention provide a location movement method for a self-mobile node, and a related device, so as to resolve a current problem that both accuracy and applicability are relatively low when movement control of a self-mobile node is implemented based on an indoor map.

According to a first aspect, a self-mobile node is provided, including:

an obtaining module, configured to obtain initial to-be-assisted location information, where the initial to-be-assisted location information is location information determined by a control device or the self-mobile node according to an assistance request received from at least one to-be-assisted node, and the assistance request carries one or more of location information of the to-be-assisted node, coverage area information of the to-be-assisted node, location information of a backhaul node used by the to-be-assisted node, coverage area information of a backhaul node used by the to-be-assisted node, or area identification information used to identify an area in which the to-be-assisted node is located; and a control module, configured to control, according to the initial to-be-assisted location information obtained by the obtaining module, the self-mobile node to move to an initial location range corresponding to the initial to-be-assisted location information, where the obtaining module is further configured to obtain finely adjusted to-be-assisted location information after the control module controls the self-mobile node to move to the initial location range, where the finely adjusted to-be-assisted location information is location information determined by the control device or the self-mobile node according to capability information of the self-mobile node, and location information and load information of each to-be-assisted node; and the control module is further configured to: control, according to the finely adjusted to-be-assisted location information obtained by the obtaining module, the self-mobile node to move to a finely adjusted location range corresponding to the finely adjusted to-be-assisted location information, and control the self-mobile node to provide an assistance service for each to-be-assisted node around the self-mobile node within the finely adjusted location range.

With reference to the first aspect, in a first possible implementation manner of the first aspect, the obtaining module includes a first receiving submodule and a first obtaining submodule, where the first receiving submodule is configured to receive a first assistance indication delivered by the control device, where the first assistance indication carries the initial to-be-assisted location information; and the first obtaining submodule is configured to obtain, according to the first assistance indication received by the first receiving submodule, the initial to-be-assisted location information carried in the first assistance indication.

With reference to the first aspect, in a second possible implementation manner of the first aspect, the obtaining module includes a second receiving submodule and a second obtaining submodule, where the second receiving submodule is configured to receive the assistance request initiated by the at least one to-be-assisted node; and the second obtaining submodule is configured to determine the initial to-be-assisted location information according to the assistance request that is initiated by the at least one to-be-assisted node and received by the second receiving submodule.

With reference to the second possible implementation manner of the first aspect, in a third possible implementation manner of the first aspect, the second obtaining submodule is specifically configured to: select any one or more to-be-assisted nodes from the at least one to-be-assisted node; and use, as the initial to-be-assisted location information, area information including location information or coverage area information of the any one or more selected to-be-assisted nodes; or use, as the initial to-be-assisted location information, area information including location information or coverage area information of a backhaul node used by the any one or more selected to-be-assisted nodes; or use, as the initial to-be-assisted location information, area information including an area corresponding to area identification information of the any one or more selected to-be-assisted nodes.

With reference to the first or the second possible implementation manner of the first aspect, in a fourth possible implementation manner of the first aspect, the obtaining module further includes a first sending submodule, a third receiving submodule, and a third obtaining submodule, where the first sending submodule is configured to report the capability information of the self-mobile node to the control device after the control module controls the self-mobile node to move to the initial location range;

the third receiving submodule is configured to receive a second assistance indication delivered by the control device, where the second assistance indication carries the finely adjusted to-be-assisted location information; and the third obtaining submodule is configured to obtain, according to the second assistance indication received by the third receiving submodule, the finely adjusted to-be-assisted location information carried in the second assistance indication.

With reference to the first or the second possible implementation manner of the first aspect, in a fifth possible implementation manner of the first aspect, the obtaining module further includes a second sending submodule, a fourth receiving submodule, and a fourth obtaining submodule, where the second sending submodule is configured to send assistance information to each to-be-assisted node around a location of the self-mobile node after the control module controls the self-mobile node to move to the initial location range;

the fourth receiving submodule is configured to receive assistance response information that is returned by each to-be-assisted node around the location of the self-mobile node and is corresponding to the assistance information, where the assistance response message carries the location information and the load information of each to-be-assisted node; and the fourth obtaining submodule is configured to determine the finely adjusted to-be-assisted location information according to the capability information of the self-mobile node, and the location information and the load information of each to-be-assisted node that are carried in the assistance response information received by the fourth receiving submodule.

With reference to the fifth possible implementation manner of the first aspect, in a sixth possible implementation manner of the first aspect, the fourth obtaining submodule is specifically configured to: select multiple to-be-assisted nodes from all the to-be-assisted nodes around the location of the self-mobile node according to the capability information of the self-mobile node and the load information of each to-be-assisted node that is carried in the assistance response information, where corresponding load of the multiple to-be-assisted nodes is not less than a specified load threshold; and determine the finely adjusted to-be-assisted location information according to location information and load information of the multiple selected to-be-assisted nodes.

According to a second aspect, a control device is provided, including:

a receiving module, configured to receive one or more of an assistance request from at least one to-be-assisted node or capability information of an assisting node that is reported by the assisting node, where the assistance request carries one or more of location information of the to-be-assisted node, coverage area information of the to-be-assisted node, location information of a backhaul node used by the to-be-assisted node, coverage area information of a backhaul node used by the to-be-assisted node, or area identification information used to identify an area in which the to-be-assisted node is located;

a determining module, configured to determine to-be-assisted location information, where the to-be-assisted location information includes one or more of initial to-be-assisted location information or finely adjusted to-be-assisted location information, the initial to-be-assisted location information is location information determined by the control device according to the assistance request received by the receiving module from the at least one to-be-assisted node, and the finely adjusted to-be-assisted location information is location information determined by the control device according to the capability information of the assisting node that is received by the receiving module, and location information and load information of each to-be-assisted node after the assisting node moves to an initial location range corresponding to the initial to-be-assisted location information; and a sending module, configured to send the determined to-be-assisted location information to the assisting node.

With reference to the second aspect, in a first possible implementation manner of the second aspect, the determining module is further configured to: when or after determining the initial to-be-assisted location information according to the assistance request received from the at least one to-be-assisted node, determine an assisting node that provides an assistance service for the at least one to-be-assisted node.

With reference to the first possible implementation manner of the second aspect, in a second possible implementation manner of the second aspect, the determining module is specifically configured to determine, according to a quantity of the at least one to-be-assisted node initiating the assistance request and one or more of the following information carried in the assistance request: the location information of the to-be-assisted node, the coverage area information of the to-be-assisted node, the location information of the backhaul node used by the to-be-assisted node, the coverage area information of the backhaul node used by the to-be-assisted node, or the preset area identification information used to identify the area in which the to-be-assisted node is located, the assisting node that provides the assistance service for the at least one to-be-assisted node.

With reference to the second aspect, or the first or the second possible implementation manner of the second aspect, in a third possible implementation manner of the second aspect, the determining module is specifically configured to: select any one or more to-be-assisted nodes from the at least one to-be-assisted node; and use, as the initial to-be-assisted location information, area information including location information or coverage area information of the any one or more selected to-be-assisted nodes; or use, as the initial to-be-assisted location information, area information including location information or coverage area information of a backhaul node used by the any one or more selected to-be-assisted nodes; or use, as the initial to-be-assisted location information, area information including an area corresponding to area identification information of the any one or more selected to-be-assisted nodes.

With reference to the second aspect, or the first or the second possible implementation manner of the second aspect, in a fourth possible implementation manner of the second aspect, the determining module is specifically configured to: select multiple to-be-assisted nodes from all the to-be-assisted nodes around a location of the assisting node according to the load information of each to-be-assisted node around the location of the assisting node and the capability information of the assisting node, where corresponding load of the multiple to-be-assisted nodes is not less than a specified load threshold; and determine the finely adjusted to-be-assisted location information according to location information and load information of the multiple selected to-be-assisted nodes, where the determined finely adjusted to-be-assisted location information can enable the assisting node located within a finely adjusted location range corresponding to the finely adjusted to-be-assisted location information to meet the following specified condition: products of distances from the self-mobile node to the multiple selected to-be-assisted nodes and load of the multiple selected to-be-assisted nodes are equal to or are approximately equal to each other.

With reference to the second aspect, or the first or the second possible implementation manner of the second aspect, in a fifth possible implementation manner of the second aspect, the sending module is specifically configured to send the to-be-assisted location information to the assisting node in a manner of sending, to the assisting node, an assistance indication that carries the to-be-assisted location information.

According to a third aspect, a self-mobile node is provided, including:

a processor, configured to obtain initial to-be-assisted location information, where the initial to-be-assisted location information is location information determined by a control device or the self-mobile node according to an assistance request received from at least one to-be-assisted node, and the assistance request carries one or more of location information of the to-be-assisted node, coverage area information of the to-be-assisted node, location information of a backhaul node used by the to-be-assisted node, coverage area information of a backhaul node used by the to-be-assisted node, or area identification information used to identify an area in which the to-be-assisted node is located; and a controller, configured to control, according to the initial to-be-assisted location information obtained by the processor, the self-mobile node to move to an initial location range corresponding to the initial to-be-assisted location information, where the processor is further configured to obtain finely adjusted to-be-assisted location information after the controller controls the self-mobile node to move to the initial location range, where the finely adjusted to-be-assisted location information is location information determined by the control device or the self-mobile node according to capability information of the self-mobile node, and location information and load information of the to-be-assisted node; and the controller is further configured to: control, according to the finely adjusted to-be-assisted location information obtained by the processor, the self-mobile node to move to a finely adjusted location range corresponding to the finely adjusted to-be-assisted location information, and control the self-mobile node to provide an assistance service for each to-be-assisted node around the self-mobile node within the finely adjusted location range.

With reference to the third aspect, in a first possible implementation manner of the third aspect, the self-mobile node further includes a receiver, where the receiver is configured to receive a first assistance indication delivered by the control device, where the first assistance indication carries the initial to-be-assisted location information; and the processor is specifically configured to obtain, according to the first assistance indication received by the receiver, the initial to-be-assisted location information carried in the first assistance indication.

With reference to the third aspect, in a second possible implementation manner of the third aspect, the self-mobile node further includes a receiver, where the receiver is configured to receive the assistance request initiated by the at least one to-be-assisted node; and the processor is specifically configured to determine the initial to-be-assisted location information according to the assistance request that is initiated by the at least one to-be-assisted node and received by the receiver.

With reference to the second possible implementation manner of the third aspect, in a third possible implementation manner of the third aspect, the processor is specifically configured to: select any one or more to-be-assisted nodes from the at least one to-be-assisted node; and use, as the initial to-be-assisted location information, area information including location information or coverage area information of the any one or more selected to-be-assisted nodes; or use, as the initial to-be-assisted location information, area information including location information or coverage area information of a backhaul node used by the any one or more selected to-be-assisted nodes; or use, as the initial to-be-assisted location information, area information including an area corresponding to area identification information of the any one or more selected to-be-assisted nodes.

With reference to the first or the second possible implementation manner of the third aspect, in a fourth possible implementation manner of the third aspect, the self-mobile node further includes a transmitter, where the transmitter is configured to report the capability information of the self-mobile node to the control device after the controller controls the self-mobile node to move to the initial location range;

the receiver is further configured to receive a second assistance indication delivered by the control device, where the second assistance indication carries the finely adjusted to-be-assisted location information; and the processor is specifically further configured to obtain, according to the second assistance indication received by the receiver, the finely adjusted to-be-assisted location information carried in the second assistance indication.

With reference to the first or the second possible implementation manner of the third aspect, in a fifth possible implementation manner of the third aspect, the self-mobile node further includes a transmitter, where the transmitter is configured to send assistance information to each to-be-assisted node around a location of the self-mobile node after the controller controls the self-mobile node to move to the initial location range;

the receiver is further configured to receive assistance response information that is returned by each to-be-assisted node around the location of the self-mobile node and is corresponding to the assistance information, where the assistance response message carries the location information and the load information of each to-be-assisted node; and the processor is specifically further configured to determine the finely adjusted to-be-assisted location information according to the capability information of the self-mobile node, and the location information and the load information of each to-be-assisted node that are carried in the assistance response information received by the receiver.

With reference to the fifth possible implementation manner of the third aspect, in a sixth possible implementation manner of the third aspect, the processor is specifically configured to: select multiple to-be-assisted nodes from all the to-be-assisted nodes around the location of the self-mobile node according to the capability information of the self-mobile node and the load information of each to-be-assisted node that is carried in the assistance response information, where corresponding load of the multiple to-be-assisted nodes is not less than a specified load threshold; and determine the finely adjusted to-be-assisted location information according to location information and load information of the multiple selected to-be-assisted nodes.

According to a fourth aspect, a control device is provided, including:

a receiver, configured to receive one or more of an assistance request from at least one to-be-assisted node or capability information of an assisting node that is reported by the assisting node, where the assistance request carries one or more of location information of the to-be-assisted node, coverage area information of the to-be-assisted node, location information of a backhaul node used by the to-be-assisted node, coverage area information of a backhaul node used by the to-be-assisted node, or area identification information used to identify an area in which the to-be-assisted node is located;

a processor, configured to determine to-be-assisted location information, where the to-be-assisted location information includes one or more of initial to-be-assisted location information or finely adjusted to-be-assisted location information, the initial to-be-assisted location information is location information determined by the control device according to the assistance request received by the receiver from the at least one to-be-assisted node, and the finely adjusted to-be-assisted location information is location information determined by the control device according to the capability information of the assisting node that is received by the receiver, and location information and load information of each to-be-assisted node after the assisting node moves to an initial location range corresponding to the initial to-be-assisted location information; and a transmitter, configured to send the determined to-be-assisted location information to the assisting node.

With reference to the fourth aspect, in a first possible implementation manner of the fourth aspect, the processor is further configured to: when or after determining the initial to-be-assisted location information according to the assistance request received from the at least one to-be-assisted node, determine an assisting node that provides an assistance service for the at least one to-be-assisted node.

With reference to the first possible implementation manner of the fourth aspect, in a second possible implementation manner of the fourth aspect, the processor is specifically configured to determine, according to a quantity of the at least one to-be-assisted node initiating the assistance request and one or more of the following information carried in the assistance request: the location information of the to-be-assisted node, the coverage area information of the to-be-assisted node, the location information of the backhaul node used by the to-be-assisted node, the coverage area information of the backhaul node used by the to-be-assisted node, or the preset area identification information used to identify the area in which the to-be-assisted node is located, the assisting node that provides the assistance service for the at least one to-be-assisted node.

With reference to the fourth aspect, or the first or the second possible implementation manner of the fourth aspect, in a third possible implementation manner of the fourth aspect, the processor is specifically configured to: select any one or more to-be-assisted nodes from the at least one to-be-assisted node; and use, as the initial to-be-assisted location information, area information including location information or coverage area information of the any one or more selected to-be-assisted nodes; or use, as the initial to-be-assisted location information, area information including location information or coverage area information of a backhaul node used by the any one or more selected to-be-assisted nodes; or use, as the initial to-be-assisted location information, area information including an area corresponding to area identification information of the any one or more selected to-be-assisted nodes.

With reference to the fourth aspect, or the first or the second possible implementation manner of the fourth aspect, in a fourth possible implementation manner of the fourth aspect, the processor is specifically configured to: select multiple to-be-assisted nodes from all the to-be-assisted nodes around a location of the assisting node according to the load information of each to-be-assisted node around the location of the assisting node and the capability information of the assisting node, where corresponding load of the multiple to-be-assisted nodes is not less than a specified load threshold; and determine the finely adjusted to-be-assisted location information according to location information and load information of the multiple selected to-be-assisted nodes, where the determined finely adjusted to-be-assisted location information can enable the assisting node located within a finely adjusted location range corresponding to the finely adjusted to-be-assisted location information to meet the following specified condition: products of distances from the self-mobile node to the multiple selected to-be-assisted nodes and load of the multiple selected to-be-assisted nodes are equal to or are approximately equal to each other.

With reference to the fourth aspect, or the first or the second possible implementation manner of the fourth aspect, in a fifth possible implementation manner of the fourth aspect, the transmitter is specifically configured to send the to-be-assisted location information to the assisting node in a manner of sending, to the assisting node, an assistance indication that carries the to-be-assisted location information.

According to a fifth aspect, a location movement method for a self-mobile node is provided, including:

obtaining, by a self-mobile node, initial to-be-assisted location information, and moving, according to the obtained initial to-be-assisted location information, to an initial location range corresponding to the initial to-be-assisted location information, where the initial to-be-assisted location information is location information determined by a control device or the self-mobile node according to an assistance request received from at least one to-be-assisted node, and the assistance request carries one or more of location information of the to-be-assisted node, coverage area information of the to-be-assisted node, location information of a backhaul node used by the to-be-assisted node, coverage area information of a backhaul node used by the to-be-assisted node, or area identification information used to identify an area in which the to-be-assisted node is located; and obtaining, by the self-mobile node, finely adjusted to-be-assisted location information after the moving to an initial location range, moving, according to the obtained finely adjusted to-be-assisted location information, to a finely adjusted location range corresponding to the finely adjusted to-be-assisted location information, and providing an assistance service for each to-be-assisted node around the self-mobile node within the finely adjusted location range, where the finely adjusted to-be-assisted location information is location information determined by the control device or the self-mobile node according to capability information of the self-mobile node, and location information and load information of each to-be-assisted node.

With reference to the fifth aspect, in a first possible implementation manner of the fifth aspect, the obtaining initial to-be-assisted location information includes:

receiving a first assistance indication that carries the initial to-be-assisted location information and is delivered by the control device, and obtaining the initial to-be-assisted location information according to the first assistance indication.

With reference to the fifth aspect, in a second possible implementation manner of the fifth aspect, the obtaining initial to-be-assisted location information includes:

receiving the assistance request initiated by the at least one to-be-assisted node, and determining the initial to-be-assisted location information according to the received assistance request initiated by the at least one to-be-assisted node.

With reference to the second possible implementation manner of the fifth aspect, in a third possible implementation manner of the fifth aspect, the determining the initial to-be-assisted location information according to the received assistance request initiated by the at least one to-be-assisted node includes:

selecting any one or more to-be-assisted nodes from the at least one to-be-assisted node; and using, as the initial to-be-assisted location information, area information including location information or coverage area information of the any one or more selected to-be-assisted nodes; or using, as the initial to-be-assisted location information, area information including location information or coverage area information of a backhaul node used by the any one or more selected to-be-assisted nodes; or using, as the initial to-be-assisted location information, area information including an area corresponding to area identification information of the any one or more selected to-be-assisted nodes.

With reference to the first or the second possible implementation manner of the fifth aspect, in a fourth possible implementation manner of the fifth aspect, the obtaining finely adjusted to-be-assisted location information includes:

reporting the capability information of the self-mobile node to the control device after the moving to an initial location range, and obtaining the finely adjusted to-be-assisted location information according to a second assistance indication that carries the finely adjusted to-be-assisted location information and is delivered by the control device.

With reference to the first or the second possible implementation manner of the fifth aspect, in a fifth possible implementation manner of the fifth aspect, the obtaining finely adjusted to-be-assisted location information includes:

sending assistance information to each to-be-assisted node around a location of the self-mobile node after the moving to an initial location range;

receiving assistance response information that is returned by each to-be-assisted node around the location of the self-mobile node and is corresponding to the assistance information, where the assistance response message carries the location information and the load information of each to-be-assisted node; and determining the finely adjusted to-be-assisted location information according to the capability information of the self-mobile node, and the location information and the load information of each to-be-assisted node that are carried in the received assistance response information.

With reference to the fifth possible implementation manner of the fifth aspect, in a sixth possible implementation manner of the fifth aspect, the determining the finely adjusted to-be-assisted location information according to the capability information of the self-mobile node, and the location information and the load information of each to-be-assisted node that are carried in the received assistance response information includes:

selecting multiple to-be-assisted nodes from all the to-be-assisted nodes around the location of the self-mobile node according to the capability information of the self-mobile node, and the load information of each to-be-assisted node that is carried in the assistance response information, where corresponding load of the multiple to-be-assisted nodes is not less than a specified load threshold; and determining the finely adjusted to-be-assisted location information according to location information and load information of the multiple selected to-be-assisted nodes, where the determined finely adjusted to-be-assisted location information can enable the self-mobile node located within the finely adjusted location range corresponding to the finely adjusted to-be-assisted location information to meet the following specified condition: products of distances from the self-mobile node to the multiple selected to-be-assisted nodes and load of the multiple selected to-be-assisted nodes are equal to or are approximately equal to each other.

According to a sixth aspect, a location movement method for a self-mobile node is provided, including:

determining, by a control device, to-be-assisted location information, where the to-be-assisted location information includes one or more of initial to-be-assisted location information or finely adjusted to-be-assisted location information, the initial to-be-assisted location information is location information determined by the control device according to an assistance request received from at least one to-be-assisted node, the finely adjusted to-be-assisted location information is finely adjusted to-be-assisted location information determined by the control device according to capability information of an assisting node, and location information and load information of each to-be-assisted node after the assisting node moves to an initial location range corresponding to the initial to-be-assisted location information, and the assistance request carries one or more of location information of the to-be-assisted node, coverage area information of the to-be-assisted node, location information of a backhaul node used by the to-be-assisted node, coverage area information of a backhaul node used by the to-be-assisted node, or area identification information used to identify an area in which the to-be-assisted node is located; and sending, by the control device, the determined to-be-assisted location information to the assisting node.

With reference to the sixth aspect, in a first possible implementation manner of the sixth aspect, when or after the initial to-be-assisted location information is determined according to the assistance request received from the at least one to-be-assisted node, the method further includes:

determining an assisting node that provides an assistance service for the at least one to-be-assisted node.

With reference to the first possible implementation manner of the sixth aspect, in a second possible implementation manner of the sixth aspect, the determining an assisting node that provides an assistance service for the at least one to-be-assisted node includes:

determining, according to a quantity of the at least one to-be-assisted node initiating the assistance request and one or more of the following information carried in the assistance request: the location information of the to-be-assisted node, the coverage area information of the to-be-assisted node, the location information of the backhaul node used by the to-be-assisted node, the coverage area information of the backhaul node used by the to-be-assisted node, or the preset area identification information used to identify the area in which the to-be-assisted node is located, the assisting node that provides the assistance service for the at least one to-be-assisted node.

With reference to the sixth aspect, or the first or the second possible implementation manner of the sixth aspect, in a third possible implementation manner of the sixth aspect, that the initial to-be-assisted location information is determined includes:

selecting any one or more to-be-assisted nodes from the at least one to-be-assisted node; and using, as the initial to-be-assisted location information, area information including location information or coverage area information of the any one or more selected to-be-assisted nodes; or using, as the initial to-be-assisted location information, area information including location information or coverage area information of a backhaul node used by the any one or more selected to-be-assisted nodes; or using, as the initial to-be-assisted location information, area information including an area corresponding to area identification information of the any one or more selected to-be-assisted nodes.

With reference to the sixth aspect, or the first or the second possible implementation manner of the sixth aspect, in a fourth possible implementation manner of the sixth aspect, that the finely adjusted to-be-assisted location information is determined includes:

selecting multiple to-be-assisted nodes from all the to-be-assisted nodes around a location of the assisting node according to the load information of each to-be-assisted node around the location of the assisting node and the capability information of the assisting node, where corresponding load of the multiple to-be-selected nodes is not less than a specified load threshold; and determining the finely adjusted to-be-assisted location information according to location information and load information of the multiple selected to-be-assisted nodes, where the determined finely adjusted to-be-assisted location information can enable the assisting node located within a finely adjusted location range corresponding to the finely adjusted to-be-assisted location information to meet the following specified condition: products of distances from the self-mobile node to the multiple selected to-be-assisted nodes and load of the multiple selected to-be-assisted nodes are equal to or are approximately equal to each other.

With reference to the sixth aspect, or the first or the second possible implementation manner of the sixth aspect, in a fifth possible implementation manner of the sixth aspect, the sending the determined to-be-assisted location information to the assisting node includes:

sending the to-be-assisted location information to the assisting node in a manner of sending, to the assisting node, an assistance indication that carries the to-be-assisted location information.

In the technical solutions in the embodiments of the present invention, a location movement method for a self-mobile node, and a related device are provided. A self-mobile node can move to a corresponding initial to-be-assisted location range according to initial to-be-assisted location information determined by the self-mobile node or determined by a control device; and after moving to the initial to-be-assisted location range, can move to a final finely adjusted to-be-assisted location range according to finely adjusted to-be-assisted location information determined by the self-mobile node or determined by the control device, and provide an assistance service for another to-be-assisted node within the final to-be-assisted location range. Therefore, a currently existing problem is resolved: Because a precise indoor map cannot be obtained, a self-mobile node cannot move to an accurate to-be-assisted area based on an indoor map. As a result, accuracy and applicability of on-demand movement of the self-mobile node are improved.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 1 (b) is a second schematic structural diagram of a self-mobile node according to Embodiment 1 of the present invention;

FIG. 2 (b) a location distribution diagram of multiple selected to-be-assisted nodes relative to a self-mobile node when the self-mobile node is located within a finely adjusted location range according to an embodiment of the present invention;

FIG. 7 is a schematic flowchart of a location movement method for a self-mobile node according to Embodiment 6 of the present invention.

FIGS. 8-13 are schematic flowcharts of methods of embodiments of the present invention.

DESCRIPTION OF EMBODIMENTS

To make the objectives, technical solutions, and advantages of the present invention clearer, the following further describes the present invention in detail with reference to the accompanying drawings. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Embodiment 1

Figure 1:
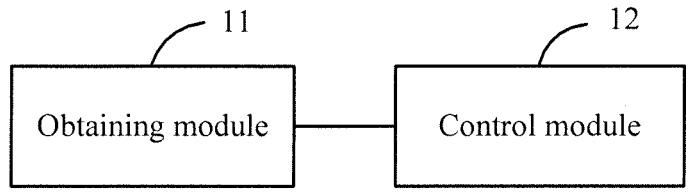
FIG. 1 (a) is a first schematic structural diagram of a self-mobile node according to Embodiment 1 of the present invention.
Figure 1:
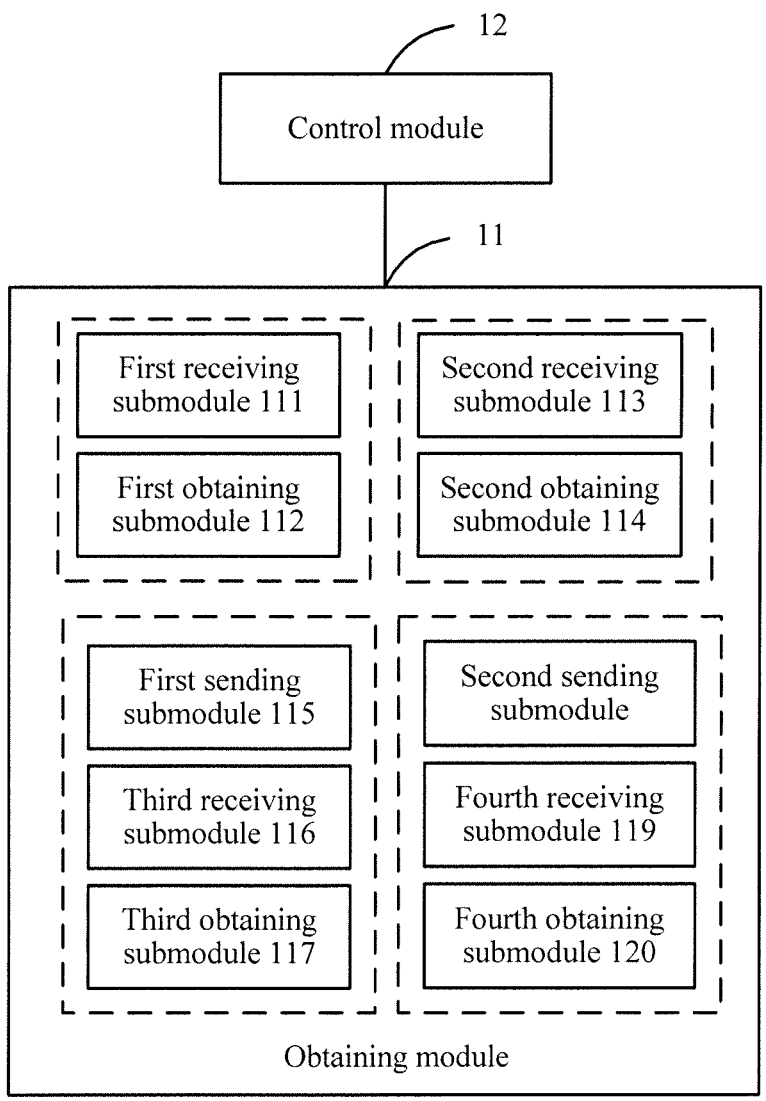

Embodiment 1 of the present invention provides a self-mobile node. The self-mobile node may be a mobile node having a corresponding WiFi function, or a mobile node having a network access function or a network service function that a base station device such as a base station or a home eNodeB has, or the like, which shall not be construed as any limitation in this embodiment of the present invention. Specifically, as shown in FIG. 1 (*a*) or FIG. 1 (*b*), FIG. 1 (*a*) or FIG. 1 (*b*) is a schematic structural diagram of the self-mobile node according to Embodiment 1 of the present invention. The self-mobile node may include an obtaining module 11 and a control module 12.

The obtaining module 11 may be configured to obtain initial to-be-assisted location information. The initial to-be-assisted location information is location information determined by a control device or the self-mobile node according to an assistance request received from at least one to-be-assisted node. Each assistance request may carry one or more of location information of the to-be-assisted node, coverage area information of the to-be-assisted node, location information of a backhaul node (Backhaul) used by the to-be-assisted node, coverage area information of a backhaul node used by the to-be-assisted node, or area identification information used to identify an area in which the to-be-assisted node is located, which shall not be construed as any limitation in this embodiment of the present invention.

Specifically, in this embodiment of the present invention, the control device may divide a specified area into multiple sub-areas in advance according to coverage areas and locations of all backhaul nodes within the specified area (a coverage area of each backhaul node may be a sub-area), and correspondingly perform coding on each sub-area to obtain area identification information used to uniquely identify the sub-area, so that each to-be-assisted node within the sub-area may add the area identification information of the sub-area to an assistance request when initiating the assistance request to the control device or the self-mobile node. Details are not described in this embodiment of the present invention. In addition, it should be noted that, each to-be-assisted node generally may be a self-mobile node in this embodiment of the present invention, and when determining that load of each to-be-assisted node exceeds a specified load threshold, each to-be-assisted node may initiate an assistance request to the control device or another self-mobile node. Details are not described in this embodiment of the present invention either.

The control module 12 may be configured to control, according to the initial to-be-assisted location information obtained by the obtaining module 11, the self-mobile node to move to an initial location range corresponding to the initial to-be-assisted location information. Specifically, because the initial to-be-assisted location information is generally corresponding to a relatively large location range, to improve location movement accuracy of the self-mobile node, when moving to the initial location range corresponding to the initial to-be-assisted location information, the self-mobile node may preferably move to a central area of the initial location range corresponding to the initial to-be-assisted location information, or may move to an area, within the initial location range, in which a quantity of to-be-assisted nodes is not less than a specified quantity threshold. Details are not described in this embodiment of the present invention.

Further, the obtaining module 11 may be further configured to obtain finely adjusted to-be-assisted location information after the self-mobile node moves to the initial location range. The finely adjusted to-be-assisted location information is location information determined by the control device or the self-mobile node according to capability information of the self-mobile node, and location information and load information of each to-be-assisted node (which generally may be each to-be-assisted node around a location of the self-mobile node, and the location of the self-mobile node herein generally refers to a location of the self-mobile node when the self-mobile node moves to the initial location range). Specifically, when the self-mobile node moves to the central area of the initial location range, each to-be-assisted node around the location of the self-mobile node generally may be each to-be-assisted node within the initial location range. Details are not described in this embodiment of the present invention.

Correspondingly, the control module 12 may be further configured to: control, according to the finely adjusted to-be-assisted location information obtained by the obtaining module 11, the self-mobile node to move to a finely adjusted location range corresponding to the finely adjusted to-be-assisted location information, and control the self-mobile node to provide an assistance service for each to-be-assisted node around the self-mobile node within the finely adjusted location range. For example, when the self-mobile node is a mobile node having a WiFi function, the self-mobile node may provide a WiFi access service for each terminal device within the finely adjusted location range, to reduce network access pressure of each to-be-assisted node within and around the finely adjusted location range or a backhaul node used by each to-be-assisted node. Details are not described in this embodiment of the present invention.

Further, it should be noted that, in this embodiment of the present invention, because the finely adjusted to-be-assisted location information is to-be-assisted location information finely adjusted on a basis of the initial to-be-assisted location information, the finely adjusted location range corresponding to the finely adjusted to-be-assisted location information is generally not greater than (may be specifically far less than) the initial location range corresponding to the initial to-be-assisted location information. Details are not described in this embodiment of the present invention.

In addition, it should be noted that, to improve location movement accuracy of the self-mobile node, after obtaining the finely adjusted to-be-assisted location information determined by the self-mobile node or determined by the control device, the self-mobile node may preferably move to a central area of the finely adjusted location range corresponding to the finely adjusted to-be-assisted location information. Details are not described in this embodiment of the present invention either.

That is, in the technical solutions of this embodiment of the present invention, a self-mobile node can move to a corresponding initial to-be-assisted location range according to initial to-be-assisted location information determined by the self-mobile node or determined by a control device; and after moving to the initial to-be-assisted location range, can move to a final finely adjusted to-be-assisted location range according to finely adjusted to-be-assisted location information determined by the self-mobile node or determined by the control device, and provide an assistance service for another to-be-assisted node within the final to-be-assisted location range. Therefore, a currently existing problem is resolved: Because a precise indoor map cannot be obtained, a self-mobile node cannot move to an accurate to-be-assisted area based on an indoor map. As a result, accuracy and applicability of on-demand movement of the self-mobile node are improved.

Specifically, as shown in FIG. 1 (*b*), in this embodiment of the present invention, the obtaining module 11 may specifically include a first receiving submodule 111 and a first obtaining submodule 112.

The first receiving submodule 111 may be configured to receive a first assistance indication delivered by the control device. The first assistance indication carries the initial to-be-assisted location information, and the first assistance indication may be sent by the control device to the self-mobile node after the control device determines the initial to-be-assisted location information according to the assistance request received from the at least one to-be-assisted node.

The first obtaining submodule 112 may be configured to obtain, according to the first assistance indication received by the first receiving submodule 111, the initial to-be-assisted location information carried in the first assistance indication.

Further, as shown in FIG. 1 (*b*), the obtaining module 11 may specifically further include a second receiving submodule 113 and a second obtaining submodule 114.

The second receiving submodule 113 may be configured to receive the assistance request initiated by the at least one to-be-assisted node.

The second obtaining submodule 114 may be configured to determine the initial to-be-assisted location information according to the assistance request that is initiated by the at least one to-be-assisted node and received by the second receiving submodule 113.

That is, the self-mobile node may obtain the initial to-be-assisted location information in two manners: passive receiving or active obtaining, which shall not be construed as any limitation in this embodiment of the present invention.

Specifically, when the self-mobile node obtains the initial to-be-assisted location information in the active obtaining manner, the second obtaining submodule 114 may be specifically configured to: select any one or more to-be-assisted nodes from the at least one to-be-assisted node; and use, as the initial to-be-assisted location information, area information including location information or coverage area information of the any one or more selected to-be-assisted nodes; or use, as the initial to-be-assisted location information, area information including location information or coverage area information of a backhaul node used by the any one or more selected to-be-assisted nodes; or use, as the initial to-be-assisted location information, area information including an area corresponding to area identification information of the any one or more selected to-be-assisted nodes, or the like, which shall not be construed as any limitation in this embodiment of the present invention.

Further, it should be noted that, when selecting any one or more to-be-assisted nodes from the at least one to-be-assisted node, the second obtaining submodule 114 may select, according to a priority of the at least one to-be-assisted node, one or more to-be-assisted nodes whose priorities are not lower than a specified priority level; or may select, as one or more selected to-be-assisted nodes according to the location information or the coverage area information or the like of the at least one to-be-assisted node, each to-be-assisted node within a particular area in which a quantity of to-be-assisted nodes initiating an assistance request is not less than a specified quantity threshold; or the like, which shall not be construed as any limitation in this embodiment of the present invention either.

Further, as shown in FIG. 1 (*b*), in this embodiment of the present invention, the obtaining module 11 may specifically further include a first sending submodule 115, a third receiving submodule 116, and a third obtaining submodule 117.

The first sending submodule 115 may be configured to report the capability information of the self-mobile node to the control device after the self-mobile node moves to the initial location range. The capability information of the self-mobile node may include information such as accessible bandwidth of a backhaul node used by the self-mobile node, and certainly may further include information such as total access bandwidth of the backhaul node used by the self-mobile node and current load of the self-mobile node, which shall not be construed as any limitation in this embodiment of the present invention.

The third receiving submodule 116 may be configured to receive a second assistance indication delivered by the control device. The second assistance indication carries the finely adjusted to-be-assisted location information, and the second assistance indication may be sent by the control device to the self-mobile node after the control device determines the finely adjusted to-be-assisted location information according to the location information and the load information of each to-be-assisted node around the location of the self-mobile node, and the capability information of the self-mobile node that is reported by the self-mobile node.

The third obtaining submodule 117 may be configured to obtain, according to the second assistance indication received by the third receiving submodule 116, the finely adjusted to-be-assisted location information carried in the second assistance indication.

Further, as shown in FIG. 1 (*b*), the obtaining module 11 may specifically further include a second sending submodule 118, a fourth receiving submodule 119, and a fourth obtaining submodule 120.

The second sending submodule 118 may be configured to send assistance information to each to-be-assisted node around the location of the self-mobile node after the self-mobile node moves to the initial location range.

The fourth receiving submodule 119 may be configured to receive assistance response information that is returned by each to-be-assisted node around the location of the self-mobile node and is corresponding to the assistance information. The assistance response message may carry the location information and the load information of each to-be-assisted node.

The fourth obtaining submodule 120 may be configured to determine the finely adjusted to-be-assisted location information according to the capability information of the self-mobile node, and the location information and the load information of each to-be-assisted node that are carried in the assistance response information received by the fourth receiving submodule 119.

That is, the self-mobile node may obtain the finely adjusted to-be-assisted location information in two manners: passive receiving or active obtaining, which shall not be construed as any limitation in this embodiment of the present invention.

Specifically, when the self-mobile node obtains the finely adjusted to-be-assisted location information in the active obtaining manner, the fourth obtaining submodule 120 may be specifically configured to: select multiple to-be-assisted nodes from all the to-be-assisted nodes around the location of the self-mobile node according to the capability information of the self-mobile node and the load information of each to-be-assisted node that is carried in the assistance response information, where corresponding load of the multiple to-be-assisted nodes is not less than a specified load threshold; and determine the finely adjusted to-be-assisted location information according to location information and load information of the multiple selected to-be-assisted nodes. The determined finely adjusted to-be-assisted location information can enable the self-mobile node located within the finely adjusted location range corresponding to the finely adjusted to-be-assisted location information to meet the following specified condition: products of distances from the self-mobile node to the multiple selected to-be-assisted nodes and load of all the multiple selected to-be-assisted nodes are equal to or are approximately equal to each other, that is, the finely adjusted to-be-assisted location information can enable the self-mobile node located within the finely adjusted location range corresponding to the finely adjusted to-be-assisted location information to provide a relatively balanced assistance service for the multiple selected to-be-assisted nodes.

Specifically, after selecting multiple to-be-assisted nodes with relatively high load from all the to-be-assisted nodes around the location of the self-mobile node, the fourth obtaining submodule 120 may construct an initial location distribution diagram of the multiple selected to-be-assisted nodes relative to the self-mobile node (in this case, the self-mobile node is located within the initial location range) according to location information of the multiple selected to-be-assisted nodes; and determine the finely adjusted to-be-assisted location information based on the initial location distribution diagram and load information of the multiple selected to-be-assisted nodes (load information of each to-be-assisted node may be indicated by using a load ratio).

Figure 2:
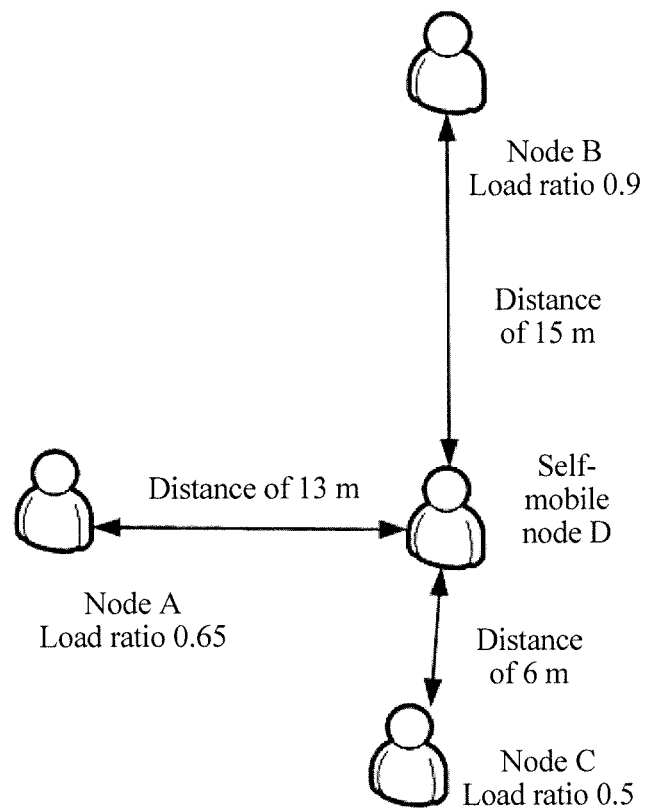
FIG. 2 (a) is an initial location distribution diagram of multiple selected to-be-assisted nodes relative to a self-mobile node according to an embodiment of the present invention.
Figure 2:
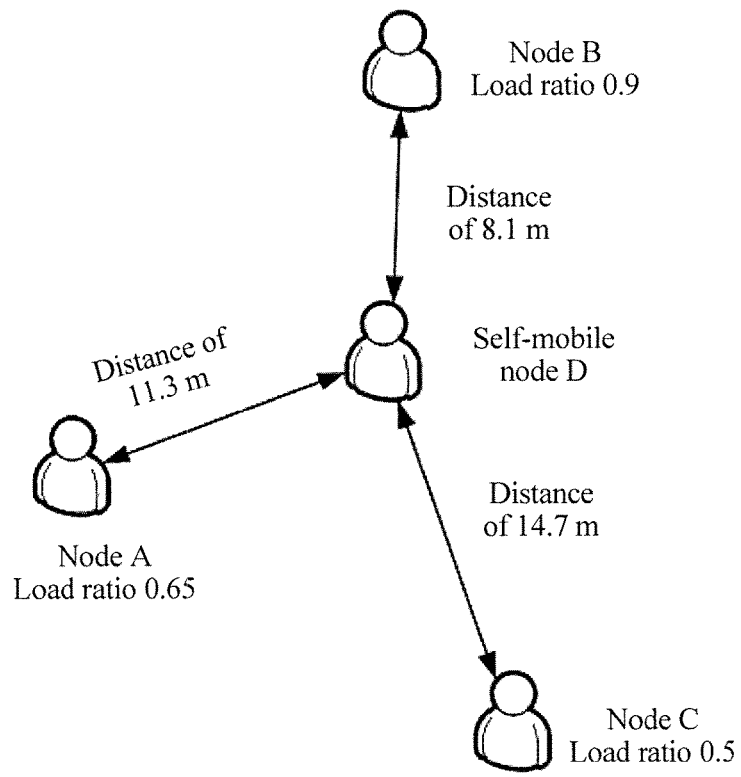

Specifically, it is assumed that the multiple selected to-be-assisted nodes are respectively a node A, a node B, and a node C, that a distance from the node A to a self-mobile node D located within the initial location range is 13 meters, a distance from the node B to the self-mobile node D located within the initial location range is 15 meters, and a distance from the node C to the self-mobile node D located within the initial location range is 6 meters, and that load of the node A is 0.65 (which is indicated by using the load ratio), load of the node B is 0.9 (which is indicated by using the load ratio), and load of the node C is 0.5 (which is indicated by using the load ratio). The constructed initial location distribution diagram (a location distribution diagram obtained before fine adjustment) of the multiple selected to-be-assisted nodes relative to the self-mobile node may be shown in FIG. 2 (*a*). Correspondingly, when the self-mobile node D moves to the finely adjusted location range corresponding to the determined finely adjusted to-be-assisted location information, a location distribution diagram (a location distribution diagram obtained after fine adjustment) of the multiple selected to-be-assisted nodes relative to the self-mobile node may be shown in FIG. 2 (*b*). In this case, a product of the distance from the self-mobile node D to the selected node A and the load of the node A, a product of the distance from the self-mobile node D to the selected node B and the load of the node B, and a product of the distance from the self-mobile node D to the selected node C and the load of the node C are approximately equal to each other.

It should be noted that, in this embodiment of the present invention, the fourth obtaining submodule 120 may be specifically further configured to directly determine the finely adjusted to-be-assisted location information according to the location information and the load information of each to-be-assisted node that are carried in the assistance response information. That is, in this case, it may be considered that the multiple to-be-assisted nodes selected from all the to-be-assisted nodes around the location of the self-mobile node are all the to-be-assisted nodes around the location of the self-mobile node. Details are not described in this embodiment of the present invention.

Embodiment 1 of the present invention provides a self-mobile node. In the technical solutions of Embodiment 1 of the present invention, the self-mobile node can move to a corresponding initial to-be-assisted location range according to initial to-be-assisted location information determined by the self-mobile node or determined by a control device; and after moving to the initial to-be-assisted location range, can move to a final finely adjusted to-be-assisted location range according to finely adjusted to-be-assisted location information determined by the self-mobile node or determined by the control device, and provide an assistance service for another to-be-assisted node within the final to-be-assisted location range. Therefore, a currently existing problem is resolved: Because a precise indoor map cannot be obtained, a self-mobile node cannot move to an accurate to-be-assisted area based on an indoor map. As a result, accuracy and applicability of on-demand movement of the self-mobile node are improved.

Embodiment 2

Figure 3:
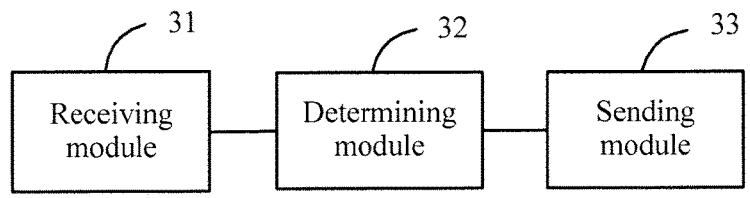
FIG. 3 is a schematic structural diagram of a control device according to Embodiment 2 of the present invention.

Embodiment 2 of the present invention provides a control device. The control device may be a network-side control device such as an RNC (Radio Network Controller, radio network control device), a BSC (Base Station Controller, base station control device), or an AP (Acess Point, wireless access node), which shall not be construed as any limitation in this embodiment of the present invention. Specifically, as shown in FIG. 3, FIG. 3 is a schematic structural diagram of the control device according to Embodiment 2 of the present invention. The control device may specifically include a receiving module 31, a determining module 32, and a sending module 33.

The receiving module 31 may be configured to receive one or more of an assistance request from at least one to-be-assisted node or capability information of an assisting node that is reported by the assisting node. The assistance request may carry one or more of location information of the to-be-assisted node, coverage area information of the to-be-assisted node, location information of a backhaul node used by the to-be-assisted node, coverage area information of a backhaul node used by the to-be-assisted node, or area identification information used to identify an area in which the to-be-assisted node is located, which shall not be construed as any limitation in this embodiment of the present invention.

The determining module 32 may be configured to determine to-be-assisted location information. The to-be-assisted location information includes one or more of initial to-be-assisted location information or finely adjusted to-be-assisted location information. The initial to-be-assisted location information may be location information determined by the control device according to the assistance request received by the receiving module 31 from the at least one to-be-assisted node. The finely adjusted to-be-assisted location information may be finely adjusted to-be-assisted location information determined by the control device according to the capability information of the assisting node that is received by the receiving module, and location information and load information of each to-be-assisted node (which generally may be each to-be-assisted node around a location of the assisting node, and the location of the self-mobile node herein generally refers to a location of the self-mobile node when the self-mobile node moves to an initial location range) after the assisting node moves to the initial location range corresponding to the initial to-be-assisted location information.

The sending module 33 may be configured to send the determined to-be-assisted location information to the assisting node, so that the assisting node moves, according to the to-be-assisted location information, to a location range corresponding to the to-be-assisted location information. Specifically, the sending module 33 may be configured to send the to-be-assisted location information to the assisting node in a manner of sending, to the assisting node, an assistance indication that carries the to-be-assisted location information, so that the assisting node moves, according to the to-be-assisted location information, to the initial location range corresponding to the to-be-assisted location information.

For example, the sending module 33 may be specifically configured to send the initial to-be-assisted location information to the assisting node in a manner of sending, to the assisting node, a first assistance indication that carries the initial to-be-assisted location information, so that the assisting node moves, according to the initial to-be-assisted location information, to the initial location range corresponding to the initial to-be-assisted location information; or may be specifically configured to send the finely adjusted to-be-assisted location information to the assisting node in a manner of sending, to the assisting node, a second assistance indication that carries the finely adjusted to-be-assisted location information, so that the assisting node moves, according to the finely adjusted to-be-assisted location information, to a finely adjusted location range corresponding to the finely adjusted to-be-assisted location information.

Further, the determining module 32 may be further configured to: when or after determining the initial to-be-assisted location information according to the assistance request received from the at least one to-be-assisted node, determine an assisting node that provides an assistance service for the at least one to-be-assisted node.

Specifically, the determining module 32 may be specifically configured to determine, according to a quantity of the at least one to-be-assisted node initiating the assistance request and one or more of the following information carried in the assistance request: the location information of the to-be-assisted node, the coverage area information of the to-be-assisted node, the location information of the backhaul node used by the to-be-assisted node, the coverage area information of the backhaul node used by the to-be-assisted node, or the preset area identification information used to identify the area in which the to-be-assisted node is located, the assisting node that provides the assistance service for the at least one to-be-assisted node. For example, the determining module 32 may be specifically configured to: determine, according to one or more of the following information carried in each assistance request: the location information of the to-be-assisted node, the coverage area information of the to-be-assisted node, the location information of the backhaul node used by the to-be-assisted node, the coverage area information of the backhaul node used by the to-be-assisted node, or the preset area identification information used to identify the area in which the to-be-assisted node is located, an area in which a quantity of to-be-assisted nodes is not less than a specified quantity threshold, and select, as the assisting node, one or more self-mobile nodes that are relatively close to the area. Details are not described in this embodiment of the present invention.

Further, an example that the to-be-assisted location information is the initial to-be-assisted location information is used in this embodiment of the present invention, and the determining module 32 may be specifically configured to determine the initial to-be-assisted location information in the following manner: selecting any one or more to-be-assisted nodes from the at least one to-be-assisted node; and using, as the initial to-be-assisted location information, area information including location information or coverage area information of the any one or more selected to-be-assisted nodes; or using, as the initial to-be-assisted location information, area information including location information or coverage area information of a backhaul node used by the any one or more selected to-be-assisted nodes; or using, as the initial to-be-assisted location information, area information including an area corresponding to area identification information of the any one or more selected to-be-assisted nodes, which shall not be construed as any limitation in this embodiment of the present invention.

It should be noted that, when selecting any one or more to-be-assisted nodes from the at least one to-be-assisted node, the determining module 32 may select, according to a priority of the at least one to-be-assisted node, one or more to-be-assisted nodes whose priorities are not lower than a specified priority level; or may select, as one or more selected to-be-assisted nodes according to the location information, or the coverage area information, or the like of the at least one to-be-assisted node, each to-be-assisted node within a particular area in which a quantity of to-be-assisted nodes initiating an assistance request is not less than a specified quantity threshold; or the like, which shall not be construed as any limitation in this embodiment of the present invention either.

Further, an example that the to-be-assisted location information is the finely adjusted to-be-assisted location information is used in this embodiment of the present invention, and after the assisting node moves to the initial location range corresponding to the initial to-be-assisted location information and after the receiving module 31 receives, from the assisting node, a reported message that carries the capability information of the assisting node, the determining module 32 may determine the finely adjusted to-be-assisted location information according to the capability information of the assisting node, and the location information and the load information of each to-be-assisted node around the location of the assisting node. Details are not described in this embodiment of the present invention.

Specifically, the determining module 32 may be configured to determine the finely adjusted to-be-assisted location information in the following manner: selecting multiple to-be-assisted nodes from all the to-be-assisted nodes around the location of the assisting node according to the load information of each to-be-assisted node around the location of the assisting node (the location of the assisting node when the assisting node moves to the initial location range) and the capability information of the assisting node, where corresponding load of the multiple to-be-assisted nodes is not less than a specified load threshold; and determining the finely adjusted to-be-assisted location information according to location information and load information of the multiple selected to-be-assisted nodes. The determined finely adjusted to-be-assisted location information can enable the assisting node located within the finely adjusted location range corresponding to the finely adjusted to-be-assisted location information to meet the following specified condition: products of distances from the self-mobile node to the multiple selected to-be-assisted nodes and load of the multiple selected to-be-assisted nodes are equal to or are approximately equal to each other, that is, the finely adjusted to-be-assisted location information can enable the assisting node located within the finely adjusted location range corresponding to the finely adjusted to-be-assisted location information to provide a relatively balanced assistance service for the multiple selected to-be-assisted nodes.

Specifically, after selecting multiple to-be-assisted nodes with relatively high load from all the to-be-assisted nodes around the location of the assisting node, the determining module 32 may construct an initial location distribution diagram of the multiple selected to-be-assisted nodes relative to the assisting node (in this case, the assisting node is located within the initial location range) according to location information of the multiple selected to-be-assisted nodes; and determine the finely adjusted to-be-assisted location information based on the initial location distribution diagram and load information of the multiple selected to-be-assisted nodes (load information of each to-be-assisted node may be indicated by using a load ratio).

Certainly, it should be noted that, in this embodiment of the present invention, the determining module 32 may be specifically further configured to directly determine the finely adjusted to-be-assisted location information according to the location information and the load information of each to-be-assisted node around the location of the assisting node. That is, in this case, it may be considered that the multiple to-be-assisted nodes selected from all the to-be-assisted nodes around the location of the assisting node are all the to-be-assisted nodes around the location of the assisting node. Details are not described in this embodiment of the present invention.

Embodiment 2 of the present invention provides a control device. In the technical solutions of Embodiment 2 of the present invention, the control device may determine to-be-assisted location information, and send the determined to-be-assisted location information to an assisting node, so that the assisting node moves, according to the to-be-assisted location information, to a location range corresponding to the to-be-assisted location information. The to-be-assisted location information may be initial to-be-assisted location information determined by the control device according to an assistance request received from at least one to-be-assisted node, and/or may be finely adjusted to-be-assisted location information determined by the control device according to capability information of the assisting node, and location information and load information of each to-be-assisted node around a location of the assisting node after the assisting node moves to an initial location range corresponding to the initial to-be-assisted location information. Therefore, a currently existing problem is resolved: Because a precise indoor map cannot be obtained, a self-mobile node cannot move to an accurate to-be-assisted area based on an indoor map. As a result, accuracy and applicability of on-demand movement of the self-mobile node are improved.

Embodiment 3

Figure 4:
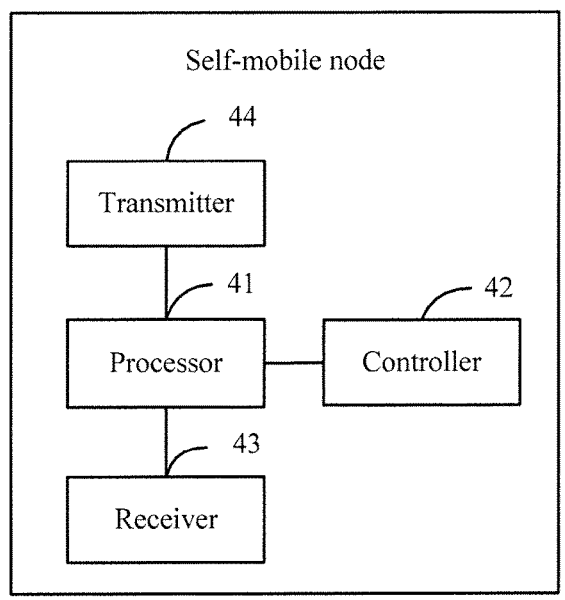
FIG. 4 is a schematic structural diagram of a self-mobile node according to Embodiment 3 of the present invention.

Embodiment 3 of the present invention provides a self-mobile node. The self-mobile node is a self-mobile node entity device that is based on a same invention conception as the self-mobile node described in Embodiment 1 of the present invention. Specifically, as shown in FIG. 4, FIG. 4 is a schematic structural diagram of the self-mobile node according to Embodiment 3 of the present invention. The self-mobile node may include components such as a processor 41 and a controller 42.

The processor 41 may be configured to obtain initial to-be-assisted location information. The initial to-be-assisted location information is location information determined by a control device or the self-mobile node according to an assistance request received from at least one to-be-assisted node. The assistance request may carry one or more of location information of the to-be-assisted node, coverage area information of the to-be-assisted node, location information of a backhaul node used by the to-be-assisted node, coverage area information of a backhaul node used by the to-be-assisted node, or area identification information used to identify an area in which the to-be-assisted node is located.

The controller 42 may be configured to control, according to the initial to-be-assisted location information obtained by the processor 41, the self-mobile node to move to an initial location range corresponding to the initial to-be-assisted location information.

Further, the processor 41 may be further configured to obtain finely adjusted to-be-assisted location information after the controller 42 controls the self-mobile node to move to the initial location range. The finely adjusted to-be-assisted location information is location information determined by the control device or the self-mobile node according to capability information of the self-mobile node, and location information and load information of the to-be-assisted node.

The controller 42 may be further configured to: control, according to the finely adjusted to-be-assisted location information obtained by the processor 41, the self-mobile node to move to a finely adjusted location range corresponding to the finely adjusted to-be-assisted location information, and control the self-mobile node to provide an assistance service for each to-be-assisted node around the self-mobile node within the finely adjusted location range.

Specifically, the self-mobile node may further include a receiver 43.

The receiver 43 may be configured to receive a first assistance indication delivered by the control device. The first assistance indication carries the initial to-be-assisted location information.

The processor 41 may be specifically configured to obtain, according to the first assistance indication received by the receiver 43, the initial to-be-assisted location information carried in the first assistance indication.

Alternatively, the receiver 43 may be configured to receive the assistance request initiated by the at least one to-be-assisted node; and correspondingly, the processor 41 may be specifically further configured to determine the initial to-be-assisted location information according to the assistance request that is initiated by the at least one to-be-assisted node and is received by the receiver 43.

That is, the self-mobile node may obtain the initial to-be-assisted location information in two manners: passive receiving or active obtaining, which shall not be construed as any limitation in this embodiment of the present invention.

Specifically, when the self-mobile node obtains the initial to-be-assisted location information in the active obtaining manner, the processor 41 may be specifically configured to:

select any one or more to-be-assisted nodes from the at least one to-be-assisted node; and use, as the initial to-be-assisted location information, area information including location information or coverage area information of the any one or more selected to-be-assisted nodes; or use, as the initial to-be-assisted location information, area information including location information or coverage area information of a backhaul node used by the any one or more selected to-be-assisted nodes; or use, as the initial to-be-assisted location information, area information including an area corresponding to area identification information of the any one or more selected to-be-assisted nodes.

Further, the self-mobile node may further include a transmitter 44.

The transmitter 44 may be configured to report the capability information of the self-mobile node to the control device after the controller 42 controls the self-mobile node to move to the initial location range.

The receiver 43 may be further configured to receive a second assistance indication delivered by the control device. The second assistance indication carries the finely adjusted to-be-assisted location information.

The processor 41 may be specifically further configured to obtain, according to the second assistance indication received by the receiver 43, the finely adjusted to-be-assisted location information carried in the second assistance indication.

Alternatively, the transmitter 44 may be configured to send assistance information to each to-be-assisted node around a location of the self-mobile node after the controller 42 controls the self-mobile node to move to the initial location range.

Correspondingly, the receiver 43 may be further configured to receive assistance response information that is returned by each to-be-assisted node around the location of the self-mobile node and is corresponding to the assistance information. The assistance response message carries the location information and the load information of each to-be-assisted node.

The processor 41 may be specifically further configured to determine the finely adjusted to-be-assisted location information according to the capability information of the self-mobile node, and the location information and the load information of each to-be-assisted node that are carried in the assistance response information received by the receiver 43.

That is, the self-mobile node may obtain the finely adjusted to-be-assisted location information in two manners: passive receiving or active obtaining, which shall not be construed as any limitation in this embodiment of the present invention.

Specifically, when the self-mobile node obtains the finely adjusted to-be-assisted location information in the active obtaining manner, the processor 41 may be specifically configured to: select multiple to-be-assisted nodes from all the to-be-assisted nodes around the location of the self-mobile node according to the capability information of the self-mobile node and the load information of each to-be-assisted node that is carried in the assistance response information, where corresponding load of the multiple to-be-assisted nodes is not less than a specified load threshold; and determine the finely adjusted to-be-assisted location information according to location information and load information of the multiple selected to-be-assisted nodes. The determined finely adjusted to-be-assisted location information can enable the self-mobile node located within the finely adjusted location range corresponding to the finely adjusted to-be-assisted location information to meet the following specified condition: products of distances from the self-mobile node to the multiple selected to-be-assisted nodes and load of the multiple selected to-be-assisted nodes are equal to or are approximately equal to each other. That is, the finely adjusted to-be-assisted location information can enable the self-mobile node located within the finely adjusted location range corresponding to the finely adjusted to-be-assisted location information to provide a relatively balanced assistance service for the multiple selected to-be-assisted nodes.

Embodiment 3 of the present invention provides a self-mobile node. In the technical solutions of Embodiment 3 of the present invention, the self-mobile node can move to a corresponding initial to-be-assisted location range according to initial to-be-assisted location information determined by the self-mobile node or determined by a control device; and after moving to the initial to-be-assisted location range, can move to a final finely adjusted to-be-assisted location range according to finely adjusted to-be-assisted location information determined by the self-mobile node or determined by the control device, and provide an assistance service for another to-be-assisted node within the final to-be-assisted location range. Therefore, a currently existing problem is resolved: Because a precise indoor map cannot be obtained, a self-mobile node cannot move to an accurate to-be-assisted area based on an indoor map. As a result, accuracy and applicability of on-demand movement of the self-mobile node are improved.

Embodiment 4

Figure 5:
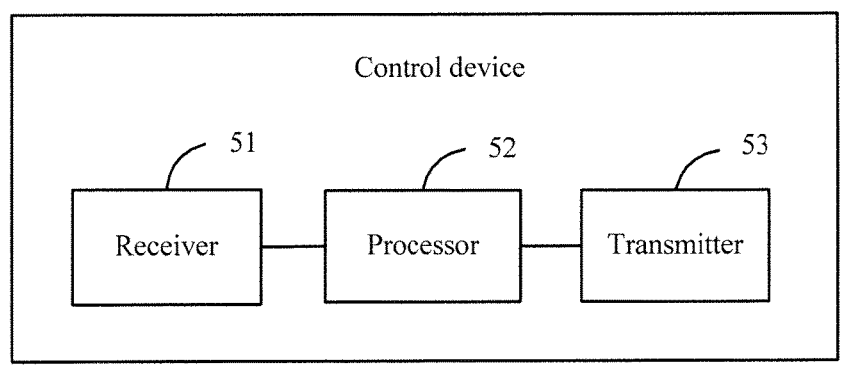
FIG. 5 is a schematic structural diagram of a control device according to Embodiment 4 of the present invention.

Embodiment 4 of the present invention provides a control device. The control device is an entity control device that is based on a same invention conception as the control device described in Embodiment 2 of the present invention. Specifically, as shown in FIG. 5, FIG. 5 is a schematic structural diagram of the control device according to Embodiment 4 of the present invention. The control device may include components such as a receiver 51, a processor 52, and a transmitter 53.

The receiver 51 may be configured to receive one or more of an assistance request from at least one to-be-assisted node or capability information of an assisting node that is reported by the assisting node. The assistance request may carry one or more of location information of the to-be-assisted node, coverage area information of the to-be-assisted node, location information of a backhaul node used by the to-be-assisted node, coverage area information of a backhaul node used by the to-be-assisted node, or area identification information used to identify an area in which the to-be-assisted node is located, which shall not be construed as any limitation in this embodiment of the present invention.

The processor 52 may be configured to determine to-be-assisted location information. The to-be-assisted location information includes one or more of initial to-be-assisted location information or finely adjusted to-be-assisted location information. The initial to-be-assisted location information is location information determined by the control device according to the assistance request received by the receiver 51 from the at least one to-be-assisted node. The finely adjusted to-be-assisted location information is location information determined by the control device according to the capability information of the assisting node that is received by the receiver 51, and location information and load information of each to-be-assisted node after the assisting node moves to an initial location range corresponding to the initial to-be-assisted location information.

The transmitter 53 may be configured to send the determined to-be-assisted location information to the assisting node, so that the assisting node moves, according to the to-be-assisted location information, to a location range corresponding to the to-be-assisted location information. Specifically, the transmitter 53 may be configured to send the to-be-assisted location information to the assisting node in a manner of sending, to the assisting node, an assistance indication that carries the to-be-assisted location information, so that the assisting node moves, according to the to-be-assisted location information, to the initial location range corresponding to the to-be-assisted location information.

Further, the processor 52 may be further configured to: when or after determining the initial to-be-assisted location information according to the assistance request received from the at least one to-be-assisted node, determine an assisting node that provides an assistance service for the at least one to-be-assisted node.

Specifically, the processor 52 may be specifically configured to determine, according to a quantity of the at least one to-be-assisted node initiating the assistance request and one or more of the following information carried in the assistance request: the location information of the to-be-assisted node, the coverage area information of the to-be-assisted node, the location information of the backhaul node used by the to-be-assisted node, the coverage area information of the backhaul node used by the to-be-assisted node, or the preset area identification information used to identify the area in which the to-be-assisted node is located, the assisting node that provides the assistance service for the at least one to-be-assisted node.

Further, an example that the to-be-assisted location information is the initial to-be-assisted location information is used in this embodiment of the present invention, and the processor 52 may be specifically configured to determine the initial to-be-assisted location information in the following manner: selecting any one or more to-be-assisted nodes from the at least one to-be-assisted node; and using, as the initial to-be-assisted location information, area information including location information or coverage area information of the any one or more selected to-be-assisted nodes; or using, as the initial to-be-assisted location information, area information including location information or coverage area information of a backhaul node used by the any one or more selected to-be-assisted nodes; or using, as the initial to-be-assisted location information, area information including an area corresponding to area identification information of the any one or more selected to-be-assisted nodes.

Further, an example that the to-be-assisted location information is the finely adjusted to-be-assisted location information is used, and the processor 52 may be specifically configured to determine the finely adjusted to-be-assisted location information in the following manner: selecting multiple to-be-assisted nodes from all the to-be-assisted node around a location of the assisting node according to the load information of each to-be-assisted node around the location of the assisting node and the capability information of the assisting node, where corresponding load of the multiple to-be-assisted nodes is not less than a specified load threshold; and determining the finely adjusted to-be-assisted location information according to location information and load information of the multiple selected to-be-assisted nodes. The determined finely adjusted to-be-assisted location information can enable the assisting node located within a finely adjusted location range corresponding to the finely adjusted to-be-assisted location information to meet the following specified condition: products of distances from the self-mobile node to the multiple selected to-be-assisted nodes and load of the multiple selected to-be-assisted nodes are equal to or are approximately equal to each other, that is, the finely adjusted to-be-assisted location information can enable the assisting node located within the finely adjusted location range corresponding to the finely adjusted to-be-assisted location information to provide a relatively balanced assistance service for the multiple selected to-be-assisted nodes.

That is, in the technical solutions of Embodiment 4 of the present invention, a control device may determine to-be-assisted location information, and send the determined to-be-assisted location information to an assisting node, so that the assisting node moves, according to the to-be-assisted location information, to a location range corresponding to the to-be-assisted location information. The to-be-assisted location information may be initial to-be-assisted location information determined by the control device according to an assistance request received from at least one to-be-assisted node, and/or may be finely adjusted to-be-assisted location information determined by the control device according to capability information of the assisting node, and location information and load information of each to-be-assisted node around a location of the assisting node after the assisting node moves to an initial location range corresponding to the initial to-be-assisted location information. Therefore, a currently existing problem is resolved: Because a precise indoor map cannot be obtained, a self-mobile node cannot move to an accurate to-be-assisted area based on an indoor map. As a result, accuracy and applicability of on-demand movement of the self-mobile node are improved.

Embodiment 5

Figure 6:
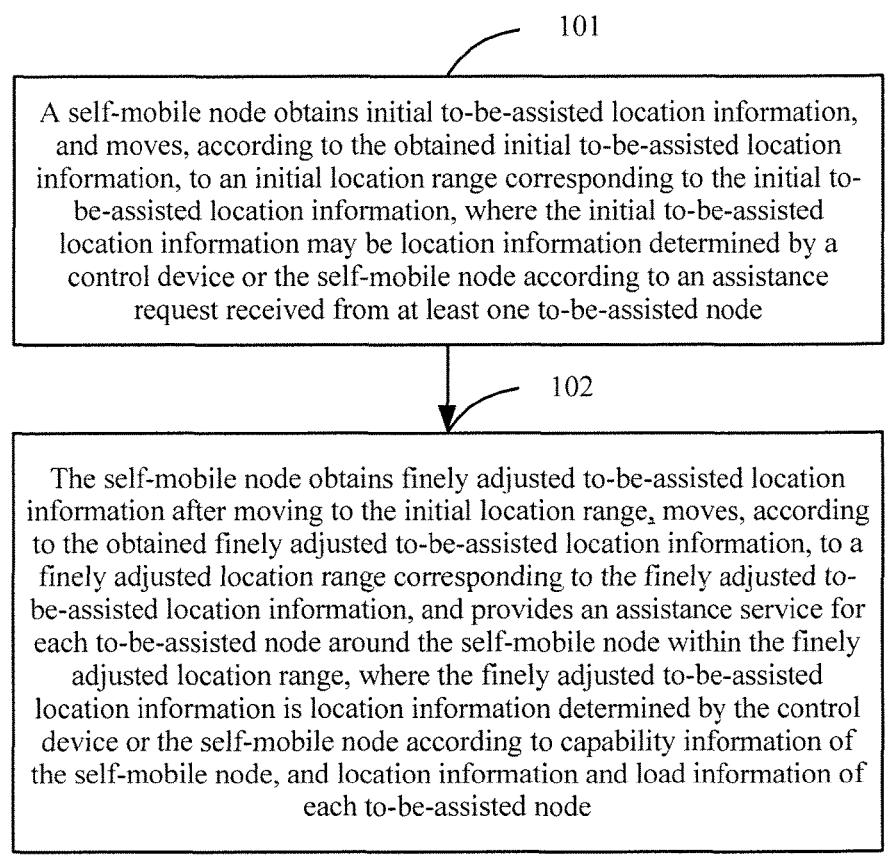
FIG. 6 is a schematic flowchart of a location movement method for a self-mobile node according to Embodiment 5 of the present invention.

Embodiment 5 of the present invention provides a location movement method for a self-mobile node that is applicable to the self-mobile node described in Embodiment 1 or Embodiment 3 of the present invention. As shown in FIG. 6, FIG. 6 is a schematic flowchart of the location movement method for a self-mobile node according to Embodiment 5 of the present invention. The method may include the following steps.

Step 101: A self-mobile node obtains initial to-be-assisted location information, and moves, according to the obtained initial to-be-assisted location information, to an initial location range corresponding to the initial to-be-assisted location information, where the initial to-be-assisted location information may be location information determined by a control device or the self-mobile node according to an assistance request received from at least one to-be-assisted node.

The assistance request may carry one or more of location information of the to-be-assisted node, coverage area information of the to-be-assisted node, location information of a backhaul node used by the to-be-assisted node, coverage area information of a backhaul node used by the to-be-assisted node, or preset area identification information used to identify an area in which the to-be-assisted node is located, which shall not be construed as any limitation in this embodiment of the present invention.

Specifically, in this embodiment of the present invention, the control device may divide a specified area into multiple sub-areas in advance according to coverage areas and locations of all backhaul nodes within the specified area (a coverage area of each backhaul node may be a sub-area), and correspondingly perform coding on each sub-area to obtain area identification information used to uniquely identify the sub-area, so that each to-be-assisted node within the sub-area may add the area identification information of the sub-area to an assistance request when initiating the assistance request to the control device or the self-mobile node. Details are not described in this embodiment of the present invention. In addition, it should be noted that, each to-be-assisted node generally may be a self-mobile node in this embodiment of the present invention, and when determining that load of each to-be-assisted node exceeds a specified load threshold, each to-be-assisted node may initiate an assistance request to the control device or another self-mobile node (that is, an assisting node). Details are not described in this embodiment of the present invention either.

Further, in this embodiment of the present invention, the self-mobile node may obtain the initial to-be-assisted location information in the following manners:

In a first manner, a first assistance indication that carries the initial to-be-assisted location information and is delivered by the control device is received, and the initial to-be-assisted location information is obtained according to the first assistance indication. The first assistance indication is sent by the control device to the self-mobile node after the control device determines the initial to-be-assisted location information according to the assistance request received from the at least one to-be-assisted node.

In a second manner, the assistance request initiated by the at least one to-be-assisted node is received, and the initial to-be-assisted location information is determined according to the received assistance request initiated by the at least one to-be-assisted node.

That is, the self-mobile node may obtain the initial to-be-assisted location information in two manners: passive receiving or active obtaining, which shall not be construed as any limitation in this embodiment of the present invention.

Specifically, when the self-mobile node obtains the initial to-be-assisted location information in the active obtaining manner, the following steps may be specifically included:

selecting any one or more to-be-assisted nodes from the at least one to-be-assisted node; and using, as the initial to-be-assisted location information, area information including location information or coverage area information of the any one or more selected to-be-assisted nodes; or using, as the initial to-be-assisted location information, area information including location information or coverage area information of a backhaul node used by the any one or more selected to-be-assisted nodes; or using, as the initial to-be-assisted location information, area information including an area corresponding to area identification information of the any one or more selected to-be-assisted nodes, which shall not be construed as any limitation in this embodiment of the present invention.

Further, it should be noted that, when selecting any one or more to-be-assisted nodes from the at least one to-be-assisted node, the self-mobile node may select, according to a priority of the at least one to-be-assisted node, one or more to-be-assisted nodes whose priorities are not lower than a specified priority level; or may select, as one or more selected to-be-assisted nodes according to the location information, or the coverage area information, or the like of the at least one to-be-assisted node, each to-be-assisted node within a particular area in which a quantity of to-be-assisted nodes initiating an assistance request is not less than a specified quantity threshold; or the like, which shall not be construed as any limitation in this embodiment of the present invention either.

Further, in this embodiment of the present invention, to improve location movement accuracy of the self-mobile node, after obtaining the initial to-be-assisted location information determined by the self-mobile node or determined by the control device, the self-mobile node may preferably move to a central area of the initial location range corresponding to the initial to-be-assisted location information, or may move to an area, within the initial location range, in which a quantity of to-be-assisted nodes is not less than a specified quantity threshold. Details are not described in this embodiment of the present invention.

Step 102: The self-mobile node obtains finely adjusted to-be-assisted location information after moving to the initial location range, moves, according to the obtained finely adjusted to-be-assisted location information, to a finely adjusted location range corresponding to the finely adjusted to-be-assisted location information, and provides an assistance service for each to-be-assisted node around the self-mobile node within the finely adjusted location range, where the finely adjusted to-be-assisted location information is location information determined by the control device or the self-mobile node according to capability information of the self-mobile node, and location information and load information of each to-be-assisted node.

Specifically, in this embodiment of the present invention, the self-mobile node may obtain the finely adjusted to-be-assisted location information in the following manners:

In a first manner, the capability information of the self-mobile node is reported to the control device after the self-mobile node moves to the initial location range, and the finely adjusted to-be-assisted location information is obtained according to a second assistance indication that carries the finely adjusted to-be-assisted location information and is delivered by the control device.

The second assistance indication is sent by the control device to the self-mobile node after the control device determines the finely adjusted to-be-assisted location information according to the location information and the load information of each to-be-assisted node around a location of the self-mobile node, and the capability information of the self-mobile node that is reported by the self-mobile node. In addition, the capability information of the self-mobile node may include information such as accessible bandwidth of a backhaul node used by the self-mobile node, and certainly may further include information such as total access bandwidth of the backhaul node used by the self-mobile node and current load of the self-mobile node, which shall not be construed as any limitation in this embodiment of the present invention.

In a second manner, assistance information is sent to each to-be-assisted node around a location of the self-mobile node after the self-mobile node moves to the initial location range; assistance response information that is returned by each to-be-assisted node around the location of the self-mobile node and is corresponding to the assistance information is received, where the assistance response message carries the location information and the load information of each to-be-assisted node; and the finely adjusted to-be-assisted location information is determined according to the capability information of the self-mobile node, and the location information and the load information of each to-be-assisted node that are carried in the received assistance response information.

That is, the self-mobile node may obtain the finely adjusted to-be-assisted location information in two manners: passive receiving or active obtaining, which shall not be construed as any limitation in this embodiment of the present invention.

Specifically, when the self-mobile node obtains the finely adjusted to-be-assisted location information in the active obtaining manner, the following steps may be specifically included:

selecting multiple to-be-assisted nodes from all the to-be-assisted nodes around the location of the self-mobile node according to the capability information of the self-mobile node, and the load information of each to-be-assisted node that is carried in the assistance response information, where corresponding load of the multiple to-be-assisted nodes is not less than a specified load threshold; and determining the finely adjusted to-be-assisted location information according to location information and load information of the multiple selected to-be-assisted nodes. The determined finely adjusted to-be-assisted location information can enable the self-mobile node located within the finely adjusted location range corresponding to the finely adjusted to-be-assisted location information to meet the following specified condition: products of distances from the self-mobile node to the multiple selected to-be-assisted nodes and load of the multiple selected to-be-assisted nodes are equal to or are approximately equal to each other. That is, the finely adjusted to-be-assisted location information can enable the self-mobile node located within the finely adjusted location range corresponding to the finely adjusted to-be-assisted location information to provide a relatively balanced assistance service for the multiple selected to-be-assisted nodes.

Specifically, after selecting multiple to-be-assisted nodes with relatively high load from all the to-be-assisted nodes around the location of the self-mobile node, the self-mobile node may construct an initial location distribution diagram of the multiple selected to-be-assisted nodes relative to the self-mobile node (in this case, the self-mobile node is located within the initial location range) according to location information of the multiple selected to-be-assisted nodes; and determine the finely adjusted to-be-assisted location information based on the initial location distribution diagram and load information of the multiple selected to-be-assisted nodes (load information of each to-be-assisted node may be indicated by using a load ratio).

For example, it is assumed that the multiple selected to-be-assisted nodes are respectively a node A, a node B, and a node C, that a distance from the node A to a self-mobile node D located within the initial location range is 13 meters, a distance from the node B to the self-mobile node D located within the initial location range is 15 meters, and a distance from the node C to the self-mobile node D located within the initial location range is 6 meters, and that load of the node A is 0.65 (which is indicated by using the load ratio), load of the node B is 0.9 (which is indicated by using the load ratio), and load of the node C is 0.5 (which is indicated by using the load ratio). The constructed initial location distribution diagram of the multiple selected to-be-assisted nodes relative to the self-mobile node may be shown in FIG. 2 (a). Correspondingly, when the self-mobile node D moves to the finely adjusted location range corresponding to the determined finely adjusted to-be-assisted location information, a location distribution diagram of the multiple selected to-be-assisted nodes relative to the self-mobile node may be shown in FIG. 2 (b). In this case, a product of the distance from the self-mobile node D to the selected node A and the load of the node A, a product of the distance from the self-mobile node D to the selected node B and the load of the node B, and a product of the distance from the self-mobile node D to the selected node C and the load of the node C are approximately equal to each other.

It should be noted that, in this embodiment of the present invention, the self-mobile node may further directly determine the finely adjusted to-be-assisted location information according to the location information and the load information of each to-be-assisted node that are carried in the assistance response information. That is, in this case, it may be considered that the multiple to-be-assisted nodes selected from all the to-be-assisted nodes around the location of the self-mobile node are all the to-be-assisted nodes around the location of the self-mobile node. Details are not described in this embodiment of the present invention.

Further, it should be noted that, in this embodiment of the present invention, because the finely adjusted to-be-assisted location information is to-be-assisted location information finely adjusted on a basis of the initial to-be-assisted location information, the finely adjusted location range corresponding to the finely adjusted to-be-assisted location information is generally not greater than (may be specifically far less than) the initial location range corresponding to the initial to-be-assisted location information. Details are not described in this embodiment of the present invention.

In addition, it should be noted that, to improve location movement accuracy of the self-mobile node, after obtaining the finely adjusted to-be-assisted location information determined by the self-mobile node or determined by the control device, the self-mobile node may preferably move to a central area of the finely adjusted location range corresponding to the finely adjusted to-be-assisted location information. Details are not described in this embodiment of the present invention either.

Embodiment 5 of the present invention provides a location movement method for a self-mobile node. In the technical solutions in Embodiment 5 of the present invention, a self-mobile node can move to a corresponding initial to-be-assisted location range according to initial to-be-assisted location information determined by the self-mobile node or determined by a control device; and after moving to the initial to-be-assisted location range, can move to a final finely adjusted to-be-assisted location range according to finely adjusted to-be-assisted location information determined by the self-mobile node or determined by the control device, and provide an assistance service for another to-be-assisted node within the final to-be-assisted location range. Therefore, a currently existing problem is resolved: Because a precise indoor map cannot be obtained, a self-mobile node cannot move to an accurate to-be-assisted area based on an indoor map. As a result, accuracy and applicability of on-demand movement of the self-mobile node are improved.

Embodiment 6

Embodiment 6 of the present invention provides a location movement method for a self-mobile node that is applicable to the self-mobile node described in Embodiment 2 or Embodiment 4 of the present invention. As shown in FIG. 7, FIG. 7 is a schematic flowchart of the location movement method for a self-mobile node according to Embodiment 6 of the present invention. The method may include the following steps.

Step 201: A control device determines to-be-assisted location information, where the to-be-assisted location information includes one or more of initial to-be-assisted location information or finely adjusted to-be-assisted location information, the initial to-be-assisted location information is location information determined by the control device according to an assistance request received from at least one to-be-assisted node, and the finely adjusted to-be-assisted location information is location information determined by the control device according to capability information of an assisting node, and location information and load information of each to-be-assisted node after the assisting node moves to an initial location range corresponding to the initial to-be-assisted location information.

The assistance request may carry one or more of location information of the to-be-assisted node, coverage area information of the to-be-assisted node, location information of a backhaul node used by the to-be-assisted node, coverage area information of a backhaul node used by the to-be-assisted node, or preset area identification information used to identify an area in which the to-be-assisted node is located, which shall not be construed as any limitation in this embodiment of the present invention.

In addition, it should be noted that, when the control device determines the initial to-be-assisted location information (that is, when a to-be-assisted node initiates an assistance request to the control device), and when or after the control device determines the initial to-be-assisted location information according to the assistance request received from the at least one to-be-assisted node, the control device may further determine an assisting node that provides an assistance service for the at least one to-be-assisted node.

Specifically, in this embodiment of the present invention, the control device may determine, according to a quantity of the at least one to-be-assisted node initiating the assistance request and one or more of the following information carried in the assistance request: the location information of the to-be-assisted node, the coverage area information of the to-be-assisted node, the location information of the backhaul node used by the to-be-assisted node, the coverage area information of the backhaul node used by the to-be-assisted node, or the preset area identification information used to identify the area in which the to-be-assisted node is located, the assisting node that provides the assistance service for the at least one to-be-assisted node.

For example, the control device may determine, according to one or more of the following information carried in each assistance request: the location information of the to-be-assisted node, the coverage area information of the to-be-assisted node, the location information of the backhaul node used by the to-be-assisted node, the coverage area information of the backhaul node used by the to-be-assisted node, or the preset area identification information used to identify the area in which the to-be-assisted node is located, an area in which a quantity of to-be-assisted nodes is not less than a specified quantity threshold, and select, as the assisting node, one or more self-mobile nodes that are relatively close to the area. Details are not described in this embodiment of the present invention.

Further, an example that the to-be-assisted location information is the initial to-be-assisted location information is used in this embodiment of the present invention, and the control device may determine the initial to-be-assisted location information in the following manner:

selecting any one or more to-be-assisted nodes from the at least one to-be-assisted node; and using, as the initial to-be-assisted location information, area information including location information or coverage area information of the any one or more selected to-be-assisted nodes; or using, as the initial to-be-assisted location information, area information including location information or coverage area information of a backhaul node used by the any one or more selected to-be-assisted nodes; or using, as the initial to-be-assisted location information, area information including an area corresponding to area identification information of the any one or more selected to-be-assisted nodes, which shall not be construed as any limitation in this embodiment of the present invention.

It should be noted that, when selecting the any one or more to-be-assisted nodes from the at least one to-be-assisted node, the control device may select, according to a priority of the at least one to-be-assisted node, one or more to-be-assisted nodes whose priorities are not lower than a specified priority level; or may select, as one or more selected to-be-assisted nodes according to the location information, or the coverage area information, or the like of the at least one to-be-assisted node, each to-be-assisted node within a particular area in which a quantity of to-be-assisted nodes initiating an assistance request is not less than a specified quantity threshold; or the like, which shall not be construed as any limitation in this embodiment of the present invention either.

Further, an example that the to-be-assisted location information is the finely adjusted to-be-assisted location information is used in this embodiment of the present invention, and after the assisting node moves to the initial location range corresponding to the initial to-be-assisted location information and after a reported message that carries the capability information of the assisting node is received from the assisting node, the control device may determine the finely adjusted to-be-assisted location information according to the capability information of the assisting node, and the location information and the load information of each to-be-assisted node around a location of the assisting node. Details are not described in this embodiment of the present invention.

Specifically, that the control device determines the finely adjusted to-be-assisted location information may include:

selecting multiple to-be-assisted nodes from all the to-be-assisted nodes around the location of the assisting node according to the load information of each to-be-assisted node around the location of the assisting node (a location of the assisting node when the assisting node moves to the initial location range) and the capability information of the assisting node, where corresponding load of the multiple to-be-assisted nodes is not less than a specified load threshold; and determining the finely adjusted to-be-assisted location information according to location information and load information of the multiple selected to-be-assisted nodes, where the determined finely adjusted to-be-assisted location information can enable the assisting node located within a finely adjusted location range corresponding to the finely adjusted to-be-assisted location information to meet the following specified condition: products of distances from the self-mobile node to the multiple selected to-be-assisted nodes and load of the multiple selected to-be-assisted nodes are equal to or are approximately equal to each other, that is, the finely adjusted to-be-assisted location information can enable the assisting node located within the finely adjusted location range corresponding to the finely adjusted to-be-assisted location information to provide a relatively balanced assistance service for the multiple selected to-be-assisted nodes.

Specifically, after selecting multiple to-be-assisted nodes with relatively high load from all the to-be-assisted nodes around the location of the assisting node, the control device may construct an initial location distribution diagram of the multiple selected to-be-assisted nodes relative to the assisting node (in this case, the assisting node is located within the initial location range) according to location information of the multiple selected to-be-assisted nodes; and determine the finely adjusted to-be-assisted location information based on the initial location distribution diagram and load information of the multiple selected to-be-assisted nodes (load information of each to-be-assisted node may be indicated by using a load ratio).

Certainly, it should be noted that, in this embodiment of the present invention, the control device may further directly determine the finely adjusted to-be-assisted location information according to the location information and the load information of each to-be-assisted node around the location of the assisting node. That is, in this case, it may be considered that the multiple to-be-assisted nodes selected from all the to-be-assisted nodes around the location of the assisting node are all the to-be-assisted nodes around the location of the assisting node. Details are not described in this embodiment of the present invention.

Step 202: The control device sends the determined to-be-assisted location information to the assisting node, so that the assisting node moves, according to the to-be-assisted location information, to a location range corresponding to the to-be-assisted location information.

Specifically, in this embodiment of the present invention, after determining the initial to-be-assisted location information according to the assistance request received from the at least one to-be-assisted node and determining the assisting node, the control device may deliver the determined initial to-be-assisted location information to the assisting node. Specifically, the control device may send the initial to-be-assisted location information to the assisting node in a manner of sending, to the assisting node, a first assistance indication that carries the initial to-be-assisted location information, so that the assisting node moves, according to the initial to-be-assisted location information, to the initial location range corresponding to the initial to-be-assisted location information. Details are not described in this embodiment of the present invention.

Further, after determining the finely adjusted to-be-assisted location information according to the capability information of the assisting node, and the location information and the load information of each to-be-assisted node around the location of the assisting node, the control device may further deliver the determined finely adjusted to-be-assisted location information to the assisting node. Specifically, the control device may send the finely adjusted to-be-assisted location information to the assisting node in a manner of sending, to the assisting node, a second assistance indication that carries the finely adjusted to-be-assisted location information, so that the assisting node moves, according to the finely adjusted to-be-assisted location information, to the finely adjusted location range corresponding to the finely adjusted to-be-assisted location information. Details are not described in this embodiment of the present invention either.

Embodiment 6 of the present invention provides a location movement method for a self-mobile node. In the technical solutions of Embodiment 6 of the present invention, a control device may determine to-be-assisted location information, and send the determined to-be-assisted location information to an assisting node, so that the assisting node moves, according to the to-be-assisted location information, to a location range corresponding to the to-be-assisted location information. The to-be-assisted location information may be initial to-be-assisted location information determined by the control device according to an assistance request received from at least one to-be-assisted node, and/or may be finely adjusted to-be-assisted location information determined by the control device according to capability information of the assisting node, and location information and load information of each to-be-assisted node around a location of the assisting node after the assisting node moves to an initial location range corresponding to the initial to-be-assisted location information. Therefore, a currently existing problem is resolved: Because a precise indoor map cannot be obtained, a self-mobile node cannot move to an accurate to-be-assisted area based on an indoor map. As a result, accuracy and applicability of on-demand movement of the self-mobile node are improved.

FIGS. 8-13 are schematic flowcharts of methods of embodiments of the present invention.

As shown in FIG. 8, in the location movement method according to the present invention, the obtaining initial to-be-assisted location information comprises: receiving a first assistance indication that carries the initial to-be-assisted location information and is delivered by the control device, and obtaining the initial to-be-assisted location information according to the first assistance indication. (800)

As shown in FIG. 9, in the location movement method according to the present invention, the obtaining initial to-be-assisted location information comprises: receiving the assistance request initiated by the at least one to-be-assisted node, and determining the initial to-be-assisted location information according to the received assistance request initiated by the at least one to-be-assisted node. (900)

As shown in FIG. 10, in the location movement method according to the present invention, the determining the initial to-be-assisted location information according to the received assistance request initiated by the at least one to-be-assisted node comprises: selecting any one or more to-be-assisted nodes from the at least one to-be-assisted node; and using, as the initial to-be-assisted location information, area information comprising location information or coverage area information of the any one or more selected to-be-assisted nodes; or using, as the initial to-be-assisted location information, area information comprising location information or coverage area information of a backhaul node used by the any one or more selected to-be-assisted nodes; or using, as the initial to-be-assisted location information, area information comprising an area corresponding to area identification information of the any one or more selected to-be-assisted nodes. (1000)

As shown in FIG. 11, in the location movement method according to the present invention, the obtaining finely adjusted to-be-assisted location information comprises: reporting the capability information of the self-mobile node to the control device after the moving to an initial location range, and obtaining the finely adjusted to-be-assisted location information according to a second assistance indication that carries the finely adjusted to-be-assisted location information and is delivered by the control device. (1100)

As shown in FIG. 12, in the location movement method according to the present invention, the obtaining finely adjusted to-be-assisted location information comprises: sending assistance information to each to-be-assisted node around a location of the self-mobile node after the moving to an initial location range; receiving assistance response information that is returned by each to-be-assisted node around the location of the self-mobile node and is corresponding to the assistance information, wherein the assistance response message carries the location information and the load information of each to-be-assisted node; and determining the finely adjusted to-be-assisted location information according to the capability information of the self-mobile node, and the location information and the load information of each to-be-assisted node that are carried in the received assistance response information. (1200)

As shown in FIG. 13, in the location movement method according to the present invention, the determining the finely adjusted to-be-assisted location information according to the capability information of the self-mobile node, and the location information and the load information of each to-be-assisted node that are carried in the received assistance response information comprises: selecting multiple to-be-assisted nodes from all the to-be-assisted nodes around the location of the self-mobile node according to the capability information of the self-mobile node, and the load information of each to-be-assisted node that is carried in the assistance response information, wherein corresponding load of the multiple to-be-assisted nodes is not less than a specified load threshold; and determining the finely adjusted to-be-assisted location information according to location information and load information of the multiple selected to-be-assisted nodes, wherein the determined finely adjusted to-be-assisted location information can enable the self-mobile node located within the finely adjusted location range corresponding to the finely adjusted to-be-assisted location information to meet the following specified condition: products of distances from the self-mobile node to the multiple selected to-be-assisted nodes and load of the multiple selected to-be-assisted nodes are equal to or are approximately equal to each other. (1300)

A person skilled in the art should understand that the embodiments of the present invention may be provided as a method, an apparatus (device), or a computer program product. Therefore, the present invention may use a form of hardware only embodiments, software only embodiments, or embodiments with a combination of software and hardware. Moreover, the present invention may use a faun of a computer program product that is implemented on one or more computer-usable storage media (including but not limited to a disk memory, a CD-ROM, an optical memory, and the like) that include computer-usable program code. (1200)

The present invention is described with reference to the flowcharts and/or block diagrams of the method, the apparatus (device), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A self-mobile node, comprising:
   a processor, configured to obtain initial to-be-assisted location information, wherein the initial to-be-assisted location information is location information determined by a control device or the self-mobile node according to an assistance request received from at least one to-be-assisted node, and the assistance request carries one or more of location information of the to-be-assisted node, coverage area information of the to-be-assisted node, location information of a backhaul node used by the to-be-assisted node, coverage area information of a backhaul node used by the to-be-assisted node, or area identification information used to identify an area in which the to-be-assisted node is located; and
   a controller, configured to control, according to the initial to-be-assisted location information obtained by the processor, the self-mobile node to move to an initial location range corresponding to the initial to-be-assisted location information, wherein
   the processor is further configured to obtain adjusted to-be-assisted location information after the controller controls the self-mobile node to move to the initial location range, wherein the adjusted to-be-assisted location information is location information determined by the control device or the self-mobile node according to capability information of the self-mobile node, and location information and load information of the to-be-assisted node; and
   the controller is further configured to: control, according to the adjusted to-be-assisted location information obtained by the processor, the self-mobile node to move to an adjusted location range corresponding to the adjusted to-be-assisted location information, and control the self-mobile node to provide an assistance service for each to-be-assisted node around the self-mobile node within the adjusted location range.

2. The self-mobile node according to claim 1, wherein the self-mobile node further comprises a receiver, wherein the receiver is configured to receive a first assistance indication delivered by the control device, wherein the first assistance indication carries the initial to-be-assisted location information; and the processor is configured to obtain, according to the first assistance indication received by the receiver, the initial to-be-assisted location information carried in the first assistance indication.

3. The self-mobile node according to claim 1, wherein the self-mobile node further comprises a receiver, wherein the receiver is configured to receive the assistance request initiated by the at least one to-be-assisted node; and the processor is configured to determine the initial to-be-assisted location information according to the assistance request that is initiated by the at least one to-be-assisted node and received by the receiver.

4. The self-mobile node according to claim 3, wherein the processor is configured to: select any one or more to-be-assisted nodes from the at least one to-be-assisted node; and use, as the initial to-be-assisted location information, area information comprising location information or coverage area information of the any one or more selected to-be-assisted nodes; or use, as the initial to-be-assisted location information, area information comprising location information or coverage area information of a backhaul node used by the any one or more selected to-be-assisted nodes; or use, as the initial to-be-assisted location information, area information comprising an area corresponding to area identification information of the any one or more selected to-be-assisted nodes.

5. The self-mobile node according to claim 2, wherein the self-mobile node further comprises a transmitter, wherein the transmitter is configured to report the capability information of the self-mobile node to the control device after the controller controls the self-mobile node to move to the initial location range;

the receiver is further configured to receive a second assistance indication delivered by the control device, wherein the second assistance indication carries the adjusted to-be-assisted location information; and the processor is further configured to obtain, according to the second assistance indication received by the receiver, the adjusted to-be-assisted location information carried in the second assistance indication.

6. The self-mobile node according to claim 2, wherein the self-mobile node further comprises a transmitter, wherein the transmitter is configured to send assistance information to each to-be-assisted node around a location of the self-mobile node after the controller controls the self-mobile node to move to the initial location range;

the receiver is further configured to receive assistance response information that is returned by each to-be-assisted node around the location of the self-mobile node and is corresponding to the assistance information, wherein the assistance response message carries the location information and the load information of each to-be-assisted node; and the processor is further configured to determine the adjusted to-be-assisted location information according to the capability information of the self-mobile node, and the location information and the load information of each to-be-assisted node that are carried in the assistance response information received by the receiver.

7. The self-mobile node according to claim 6, wherein the processor is configured to: select multiple to-be-assisted nodes from all the to-be-assisted nodes around the location of the self-mobile node according to the capability information of the self-mobile node and the load information of each to-be-assisted node that is carried in the assistance response information, wherein corresponding load of the multiple to-be-assisted nodes is not less than a specified load threshold; and determine the adjusted to-be-assisted location information according to location information and load information of the multiple selected to-be-assisted nodes.

8. A control device, comprising:

a receiver, configured to receive one or more of an assistance request from at least one to-be-assisted node or capability information of an assisting node that is reported by the assisting node, wherein the assistance request carries one or more of location information of the to-be-assisted node, coverage area information of the to-be-assisted node, location information of a backhaul node used by the to-be-assisted node, coverage area information of a backhaul node used by the to-be-assisted node, or area identification information used to identify an area in which the to-be-assisted node is located;

a processor, configured to determine to-be-assisted location information, wherein the to-be-assisted location information comprises one or more of initial to-be-assisted location information or adjusted to-be-assisted location information, the initial to-be-assisted location information is location information determined by the control device according to the assistance request received by the receiver from the at least one to-be-assisted node, and the adjusted to-be-assisted location information is location information determined by the control device according to the capability information of the assisting node that is received by the receiver, and location information and load information of each to-be-assisted node after the assisting node moves to an initial location range corresponding to the initial to-be-assisted location information; and a transmitter, configured to send the determined to-be-assisted location information to the assisting node.

9. The control device according to claim 8, wherein the processor is further configured to: when or after determining the initial to-be-assisted location information according to the assistance request received from the at least one to-be-assisted node, determine an assisting node that provides an assistance service for the at least one to-be-assisted node.

10. The control device according to claim 9, wherein the processor is configured to determine, according to a quantity of the at least one to-be-assisted node initiating the assistance request and one or more of the following information carried in the assistance request: the location information of the to-be-assisted node, the coverage area information of the to-be-assisted node, the location information of the backhaul node used by the to-be-assisted node, the coverage area information of the backhaul node used by the to-be-assisted node, or the preset area identification information used to identify the area in which the to-be-assisted node is located, the assisting node that provides the assistance service for the at least one to-be-assisted node.

11. The control device according to claim 8, wherein the processor is configured to: select any one or more to-be-assisted nodes from the at least one to-be-assisted node; and use, as the initial to-be-assisted location information, area information comprising location information or coverage area information of the any one or more selected to-be-assisted nodes; or use, as the initial to-be-assisted location information, area information comprising location information or coverage area information of a backhaul node used by the any one or more selected to-be-assisted nodes; or use, as the initial to-be-assisted location information, area information comprising an area corresponding to area identification information of the any one or more selected to-be-assisted nodes.

12. The control device according to claim 8, wherein the processor is configured to: select multiple to-be-assisted nodes from all the to-be-assisted nodes around a location of the assisting node according to the load information of each to-be-assisted node around the location of the assisting node and the capability information of the assisting node, wherein corresponding load of the multiple to-be-assisted nodes is not less than a specified load threshold; and determine the adjusted to-be-assisted location information according to location information and load information of the multiple selected to-be-assisted nodes, wherein the determined adjusted to-be-assisted location information can enable the assisting node located within an adjusted location range corresponding to the adjusted to-be-assisted location information to meet the following specified condition: products of distances from the self-mobile node to the multiple selected to-be-assisted nodes and load of the multiple selected to-be-assisted nodes are equal to or are approximately equal to each other.

13. The control device according to claim 8, wherein the transmitter is configured to send the to-be-assisted location information to the assisting node in a manner of sending, to the assisting node, an assistance indication that carries the to-be-assisted location information.

14. A location movement method for a self-mobile node, comprising:
obtaining, by a self-mobile node, initial to-be-assisted location information, and moving, according to the obtained initial to-be-assisted location information, to an initial location range corresponding to the initial to-be-assisted location information, wherein the initial to-be-assisted location information is location information determined by a control device or the self-mobile node according to an assistance request received from at least one to-be-assisted node, and the assistance request carries one or more of location information of the to-be-assisted node, coverage area information of the to-be-assisted node, location information of a backhaul node used by the to-be-assisted node, coverage area information of a backhaul node used by the to-be-assisted node, or area identification information used to identify an area in which the to-be-assisted node is located; and
obtaining, by the self-mobile node, adjusted to-be-assisted location information after the moving to an initial location range, moving, according to the obtained adjusted to-be-assisted location information, to an adjusted location range corresponding to the adjusted to-be-assisted location information, and providing an assistance service for each to-be-assisted node around the self-mobile node within the adjusted location range, wherein the adjusted to-be-assisted location information is location information determined by the control device or the self-mobile node according to capability information of the self-mobile node, and location information and load information of each to-be-assisted node.

15. The location movement method according to claim 14, wherein the obtaining initial to-be-assisted location information comprises:
receiving a first assistance indication that carries the initial to-be-assisted location information and is delivered by the control device, and obtaining the initial to-be-assisted location information according to the first assistance indication.

16. The location movement method according to claim 14, wherein the obtaining initial to-be-assisted location information comprises:
receiving the assistance request initiated by the at least one to-be-assisted node, and determining the initial to-be-assisted location information according to the received assistance request initiated by the at least one to-be-assisted node.

17. The location movement method according to claim 16, wherein the determining the initial to-be-assisted location information according to the received assistance request initiated by the at least one to-be-assisted node comprises:
selecting any one or more to-be-assisted nodes from the at least one to-be-assisted node; and using, as the initial to-be-assisted location information, area information comprising location information or coverage area information of the any one or more selected to-be-assisted nodes; or using, as the initial to-be-assisted location information, area information comprising location information or coverage area information of a backhaul node used by the any one or more selected to-be-assisted nodes; or using, as the initial to-be-assisted location information, area information comprising an area corresponding to area identification information of the any one or more selected to-be-assisted nodes.

18. The location movement method according to claim 17, wherein the obtaining adjusted to-be-assisted location information comprises:
reporting the capability information of the self-mobile node to the control device after the moving to an initial location range, and obtaining the adjusted to-be-assisted location information according to a second assistance indication that carries the adjusted to-be-assisted location information and is delivered by the control device.

19. The location movement method according to claim 17, wherein the obtaining adjusted to-be-assisted location information comprises:
sending assistance information to each to-be-assisted node around a location of the self-mobile node after the moving to an initial location range;
receiving assistance response information that is returned by each to-be-assisted node around the location of the self-mobile node and is corresponding to the assistance information, wherein the assistance response message carries the location information and the load information of each to-be-assisted node; and
determining the adjusted to-be-assisted location information according to the capability information of the self-mobile node, and the location information and the load information of each to-be-assisted node that are carried in the received assistance response information.

20. The location movement method according to claim 19, wherein the determining the adjusted to-be-assisted location information according to the capability information of the self-mobile node, and the location information and the load information of each to-be-assisted node that are carried in the received assistance response information comprises:
selecting multiple to-be-assisted nodes from all the to-be-assisted nodes around the location of the self-mobile node according to the capability information of the self-mobile node, and the load information of each to-be-assisted node that is carried in the assistance response information, wherein corresponding load of the multiple to-be-assisted nodes is not less than a specified load threshold; and determining the adjusted to-be-assisted location information according to location information and load information of the multiple selected to-be-assisted nodes, wherein the determined adjusted to-be-assisted location information can enable the self-mobile node located within the adjusted location range corresponding to the adjusted to-be-assisted location information to meet the following specified condition: products of distances from the self-mobile node to the multiple selected to-be-assisted nodes and load of the multiple selected to-be-assisted nodes are equal to or are approximately equal to each other.

* * * * *